US011113215B2

(12) United States Patent
Oh et al.

(10) Patent No.: US 11,113,215 B2
(45) Date of Patent: Sep. 7, 2021

(54) ELECTRONIC DEVICE FOR SCHEDULING A PLURALITY OF TASKS AND OPERATING METHOD THEREOF

(71) Applicant: Samsung Electronics Co., Ltd., Suwon-si (KR)

(72) Inventors: Youngmin Oh, Suwon-si (KR); Kibeom Kim, Suwon-si (KR); Sangho Lee, Suwon-si (KR); Yeona Hong, Suwon-si (KR); Gajin Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/698,430

(22) Filed: Nov. 27, 2019

(65) Prior Publication Data

US 2020/0167299 A1  May 28, 2020

(30) Foreign Application Priority Data

Nov. 28, 2018 (KR) ........................ 10-2018-0149683

(51) Int. Cl.
*G06F 13/24* (2006.01)
*G06F 9/38* (2018.01)
*G06F 9/48* (2006.01)
*G06Q 10/06* (2012.01)

(52) U.S. Cl.
CPC ............ *G06F 13/24* (2013.01); *G06F 9/3851* (2013.01); *G06F 9/4812* (2013.01); *G06Q 10/063112* (2013.01)

(58) Field of Classification Search
CPC ....... G06F 13/24; G06F 9/3851; G06F 9/4812
See application file for complete search history.

(56) References Cited

U.S. PATENT DOCUMENTS

| 6,539,283 | B2 | 3/2003 | Takagi |
| 8,141,044 | B2 | 3/2012 | Mann et al. |
| 9,922,655 | B2 * | 3/2018 | Hardee .................... G10L 25/93 |
| 10,489,750 | B2 * | 11/2019 | Isherwood ......... G06Q 10/1097 |
| 10,496,705 | B1 * | 12/2019 | Irani .......................... G06F 9/44 |
| 10,699,717 | B2 * | 6/2020 | Orr .......................... G10L 17/22 |
| 2001/0027463 | A1 | 10/2001 | Kobayashi |

(Continued)

OTHER PUBLICATIONS

ISA/KR, International Search Report and Written Opinion of the International Searching Authority, International Application No. PCT/KR2019/016302, dated Mar. 10, 2020, 8 pages.

*Primary Examiner* — Henry Tsai
*Assistant Examiner* — Christopher A Daley

(57) ABSTRACT

An electronic device which schedules a plurality of tasks, and an operating method thereof. The electronic device includes a processor and a memory operatively connected to the processor, and when being executed, the memory stores instructions that cause the processor to: detect occurrence of an interrupt requesting performance of a second task while performing a first task; obtain reference values according to a time of the first task, and reference values according to a time of the second task; schedule the first task and the second task based on a reference value of the first task and a reference value of the second task which correspond to a time at which the interrupt occurs; and process the first task and the second task based on a result of the scheduling. Other embodiments are possible.

20 Claims, 16 Drawing Sheets

(56) References Cited

U.S. PATENT DOCUMENTS

| | | |
|---|---|---|
| 2005/0235085 A1 | 10/2005 | Ichinose et al. |
| 2007/0067533 A1* | 3/2007 | So .......................... G06F 13/24 |
| | | 710/260 |
| 2014/0074483 A1* | 3/2014 | van Os .................. G06F 3/167 |
| | | 704/275 |
| 2015/0169368 A1 | 6/2015 | Pai et al. |
| 2017/0269964 A1* | 9/2017 | Ashbaugh ................ G06F 9/48 |
| 2017/0345429 A1 | 11/2017 | Hardee et al. |
| 2019/0339693 A1* | 11/2019 | Menon ................ G05D 1/0027 |

* cited by examiner

ELECTRONIC DEVICE FOR SCHEDULING A PLURALITY OF TASKS AND OPERATING METHOD THEREOF

CROSS-REFERENCE TO RELATED APPLICATION

This application is based on and claims priority under 35 U.S.C. § 119 to Korean Patent Application No. 10-2018-0149683, filed on Nov. 28, 2018, in the Korean Intellectual Property Office, the disclosure of which is herein incorporated by reference in its entirety.

BACKGROUND

1. Field

Various embodiments of the disclosure relate to an electronic device which schedules a plurality of tasks, and an operating method thereof.

2. Description of Related Art

Recently, electronic devices providing artificial intelligence (AI) services, for example, social robots, are provided. The social robot refers to an emotional robot which communes with people by employing AI, Internet of Things (IoT), cloud computing, or the like.

An electronic device providing an AI service, such as a social robot, determines a task corresponding to a received command when the command is received from a user, and performs at least one action corresponding to the determined task. With the enhancement of technology, users' expectation of electronic devices increases, and accordingly, electronic devices receive many more commands from users. Accordingly, an electronic device may encounter a situation in which, in the middle of processing a task corresponding to a specific command, the electronic device receives a command requesting processing of another task.

The above information is presented as background information only to assist with an understanding of the disclosure. No determination has been made, and no assertion is made, as to whether any of the above might be applicable as prior art with regard to the disclosure.

SUMMARY

When receiving a second command in the middle of processing a task corresponding to a first command, an electronic device may process the corresponding tasks based on priorities pre-set for the first command and the second command. For example, the electronic device may compare a priority pre-set for the first command and a priority pre-set for the second command, may cancel processing of the task corresponding to the first command and may process a task corresponding to the second command according to a result of comparing the priorities, or may complete processing of the task corresponding to the first command and then may process the task corresponding to the second command. However, when the corresponding tasks are processed according to the priorities pre-set for the commands as described above, there may be a limit to coping with many different situations occurring in real life.

Therefore, various embodiments of the disclosure provide a method and an apparatus which determine a reference value which is changeable over time with respect to each of a plurality of tasks, and schedule the plurality of tasks by using the determined reference value.

The technical object to be achieved by the disclosure is not limited to that mentioned above, and other technical objects that are not mentioned above may be clearly understood to those skilled in the art based on the description provided below.

An electronic device according to various embodiments may include a processor, and a memory operatively connected to the processor, and, when being executed, the memory may store instructions that cause the processor to: detect occurrence of an interrupt requesting performance of a second task while performing a first task; obtain reference values according to a time of the first task, and reference values according to a time of the second task: schedule the first task and the second task based on a reference value of the first task and a reference value of the second task which correspond to a time at which the interrupt occurs; and process the first task and the second task based on a result of the scheduling.

An operating method of an electronic device according to various embodiments may include: detecting occurrence of an interrupt requesting performance of a second task while performing a first task; obtaining reference values according to a time of the first task, and reference values according to a time of the second task; scheduling the first task and the second task based on a reference value of the first task and a reference value of the second task which correspond to a time at which the interrupt occurs; and processing the first task and the second task based on a result of the scheduling.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
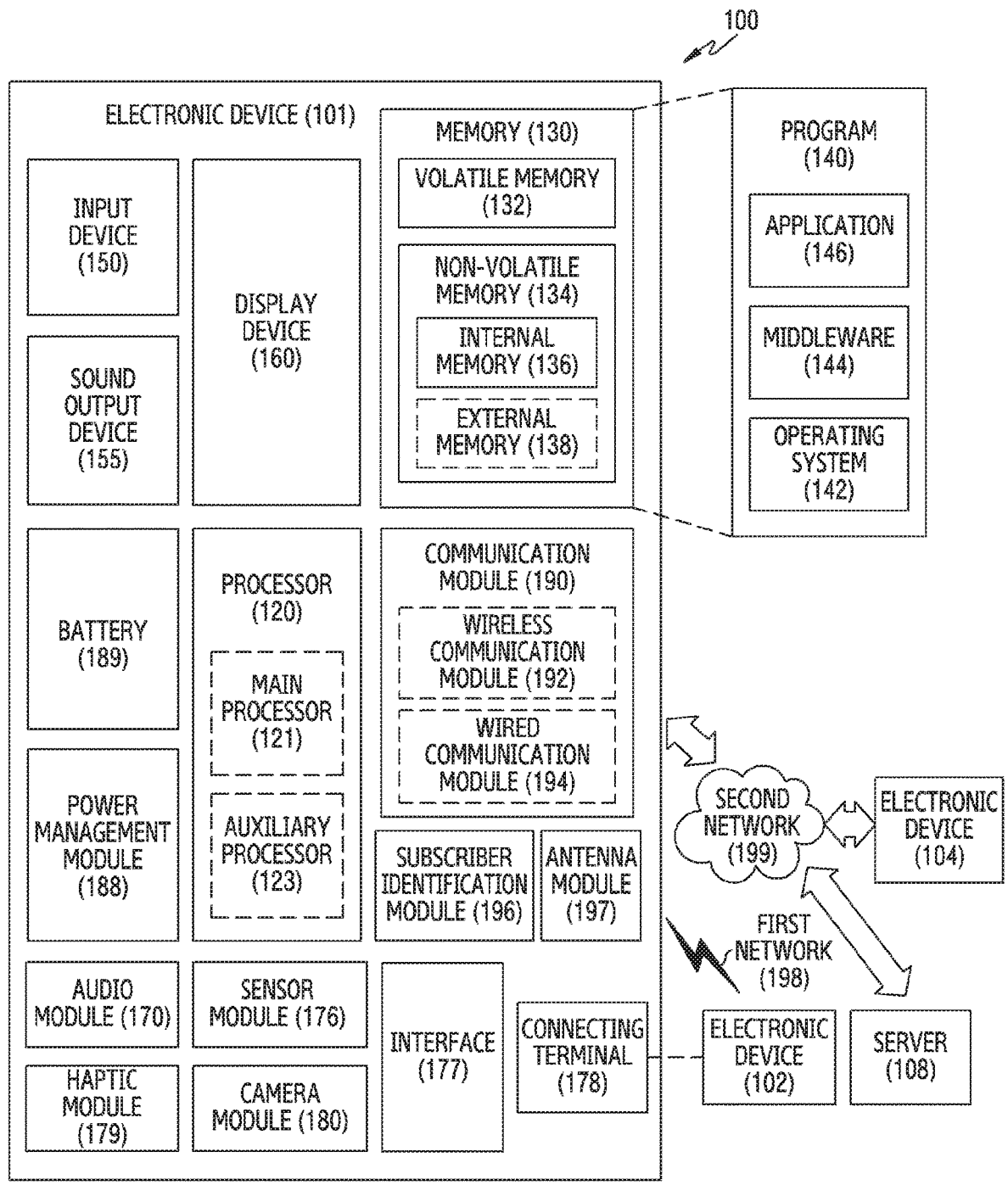
FIG. 1 illustrates a block diagram of an electronic device in a network environment according to various embodiments.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described with reference to the accompanying drawings. It should be understood that the embodiments and the terms used herein are not intended to limit the disclosure to the particular forms disclosed and the disclosure is to cover various modifications, equivalents, and/or alternatives of the corresponding embodiments. In describing the drawings, similar reference numerals may be used to designate similar elements. As used herein, the singular forms may include the plural forms as well, unless the context clearly indicates otherwise.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other components (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to various embodiments, the processor 120 may determine a scheduling type of a plurality of tasks, and may control to process the plurality of tasks according to the determined scheduling type. For example, the processor 120 may detect occurrence of an interrupt requesting performance of a second task in the middle of performing a first task, and may determine a scheduling type for determining a processing order of the plurality of tasks including the first task currently processed, the second task corresponding to the interrupt, and/or at least one scheduled third task. The task may include a plurality of sequence actions that the electronic device 101 should perform in response to a user's command being received or an event (for example, an alarm event, a call-related event, or a designated event) being occurred. The interrupt may refer to a user command or an event which is detected in the electronic device 101 while at least one task is being performed. According to an embodiment, the scheduling type may include at least one of an interrupt type, a merge type, a delay time, or a reject type. The interrupt type may be a type according to which, when an interrupt requesting processing of the second task occurs in the middle of processing the first task, the processing of the first task is interrupted at a time when the interrupt occurs, and the second task is processed. The merge type may be a type according to which, when the interrupt requesting processing of the second task occurs in the middle of processing the first task, the processing of the first task is temporarily interrupted at the time when the interrupt occurs and the second task is processed, and then the first task is performed again, or the first task and the second task are processed simultaneously. Processing the first task and the second task simultaneously may refer to starting the processing the second task from the time when the interrupt occurs, while keeping processing the first task. According to an embodiment, in the merge type, at least one of the first task and the second task may be processed in a background mode. The delay type may be a type according to which, when the interrupt requesting processing of the second task occurs in the middle of processing the first task, a time to process the second task may be delayed to a time after the processing of the first task is completed. For example, the delay type may be a type according to which the second task is processed after the processing of the first task is completed. The reject type may be a type according to which the second task is not processed. For example, the reject type may refer to a type according to which processing of the second task is rejected due to the first task and/or the scheduled third task, and a user is notified of the rejection of the processing of the second task.

According to various embodiments, the processor 120 may dynamically determine the scheduling type based on at least one of an affinity of each user, a task type, a task performing time, or a remaining capacity of a battery. The affinity of each user may be determined based on at least one of the number (or cumulative number) of times of receiving commands from each user, or a time (cumulative time) spent interacting (or mutually communicating) with the user according to a command of each user and/or an event. For example, the processor 120 may determine an affinity of a user who commands the electronic device 101 many times, and spends a long time interacting from among a plurality of users to be high. The task type may include at least one of an emergency type, an important type, a normal type, an event type, a notification type, or an unknown type. This is merely an example, and various embodiments of the disclosure are not limited thereto. The task performing time may include at least one of a total time required to perform the task, a remaining time to perform the task, an end time of the task, or a start time of the task. According to an embodiment, the total time required to perform the task, or the remaining time to perform the task may be already determined based on actions included in the task, or may be an estimated time, and may be refined by learning. For example, the time required to perform the first task may be learned or refined by repeatedly performing the first task.

According to various embodiments, the processor 120 may determine a reference value regarding each of the plurality of tasks, based on a user's affinity for each task, a type of each task, or a performing time of each task. According to an embodiment, the reference value regarding each of the plurality of tasks may be expressed in the form of a function the value of which changes over time, or in the form of a fixed value. For example, a reference value of the first task may be expressed in the form of a function the value of which increases or decreases over time. In another example, a reference value of the second task may be expressed as a constant the value of which is constant regardless of time change. This is merely an example, and various embodiments of the disclosure are not limited thereto. According to an embodiment, the processor 120 may determine a reference value of each task by using a function that uses a user's affinity corresponding to a command and/or an event of the task, and a type of the task as parameters. For example, the processor 120 may determine a reference value of each task simply by multiplying a digitized task type and a digitized affinity. Each task type may be expressed in the form of a constant or a function the value of which changes over time. According to an embodiment, when a user corresponding to the first task and a user corresponding to the second task are different from each other, the processor 120 may determine a reference value of the first task based on a user affinity of the first task and a type of the first task, and may determine a reference value of the second task based on a user affinity of the second task and a type of the second task. According to an embodiment, when the user corresponding to the first task and the user corresponding to the second task are the same as each other, the processor 120 may determine a reference value of the first task based on the type of the first task, and may determine a reference value of the second task based on the type of the second task, since the user affinity of the first task and the user affinity of the second task are the same as each other. According to an embodiment, when the user corresponding to the first task and the user corresponding to the second task are the same as each other, and the type of the first task and the type of the second task are the same as each other, the processor 120 may give a weight to the second task such that a reference value of the second task occurring at a later time has a larger value than a reference value of the first task.

According to an embodiment, the processor 120 may set a user of a master authority based on a user input, and may set an affinity of the user of the master authority to a fixed maximum value. For example, the processor 120 may fix the affinity of the user of the master authority to the maximum value, such that a task of a command and/or an event of the user of the master authority is performed always in preference to tasks of commands and/or events of other users. According to an embodiment, the processor 120 may limit affinities of other users having no master authority to values smaller than the maximum value. According to an embodiment, the processor 120 may set a reference value regarding the task of the command and/or the event of the user of the master authority to a maximum value. For example, the processor 120 may fix the reference value of the task corresponding to the user of the master authority to the maximum value, such that the task of the command and/or the event of the user of the master authority is performed always in preference to tasks of commands and/or events of other users. According to an embodiment, the processor 120 may limit reference values of the tasks corresponding to the commands and/or events of other users having no master authority to values smaller than the maximum value.

According to various embodiments, when the reference values of the plurality of tasks are determined, the processor 120 may determine a scheduling type by comparing reference values corresponding to a time at which an interrupt occurs. For example, when an interrupt requesting processing of the second task is detected at a first time while the first task is being processed, the processor 120 may compare a reference value of the first task corresponding to the first time and a reference value of the second task corresponding to the first time, and may determine a scheduling type based on a result of comparing. According to an embodiment, when the reference value of the first task corresponding to the first time is smaller than the reference value of the second task corresponding to the first time, the processor 120 may determine the scheduling type to be the merge type or the interrupt type. When the reference value of the first task corresponding to the first time is smaller than the reference value of the second task corresponding to the first time, the processor 120 may determine any one of the merge type or the interrupt type as the scheduling type, based on an attribute of the first task. For example, when the reference value of the first task corresponding to the first time is smaller than the reference value of the second task corresponding to the first time, and the attribute of the first task is a designated attribute, the processor 120 may determine the scheduling type to be the merge type. The designated attribute may include an attribute of a task that provides a meaningful result to a user only when the task is performed to the end even if the task is temporarily interrupted and is re-executed. In another example, when the reference value of the first task corresponding to the first time is smaller than the reference value of the second task corresponding to the first time, and the attribute of the first task is not the designated attribute, the processor 120 may determine the scheduling type to be the interrupt type. According to an embodiment, when the reference value of the first task corresponding to the first time is larger than the reference value of the second task corresponding to the first time, the processor 120 may determine the scheduling type to be the delay type or the reject type. When the reference value of the first task corresponding to the first time is larger than the reference value of the second task corresponding to the first time, the processor 120 may determine any one of the delay type or the reject type as the scheduling type, based on whether there exists a third task scheduled within an estimated time of completion of the first task and the second task, and/or a reference value of the third task. For example, when the reference value of the first task corresponding to the first time is larger than the reference value of the second task corresponding to the first time, and there does not exist the third task scheduled within the estimated time of completion of the first task and the second task, the processor 120 may determine the scheduling type to be the delay type. In another example, when the reference value of the first task corresponding to the first time is larger than the reference value of the second task corresponding to the first time, there exists the third task scheduled within the estimated time of completion of the first task and the second task, and a reference value of the third task is smaller than the reference value of the second task, the processor 120 may determine the scheduling type to be the delay type. In still another example, when the reference value of the first task corresponding to the first time is larger than the reference value of the second task corresponding to the first time, there exists the third task scheduled within the estimated time of completion of the first task and the second task, and the reference value of the third task is larger than or equal to the reference value of the second task, the processor 120 may determine the scheduling type to be the reject type. According to an embodiment, the processor 120 may determine whether there exists the third task scheduled within the estimated time of completion of the first task and the second task, based on a remaining capacity of the battery. For example, the processor 120 may determine a battery charging start time based on the remaining capacity of the battery, and, when the battery charging start time is before the estimated time of completion of the first task and the second task, the processor 120 may determine that there exists the third task scheduled within the estimated time of completion of the first task and the second task.

According to various embodiments, when the scheduling type is determined, the processor 120 may provide a task scheduling result to the user in the form of a voice and/or a graphic, based on the determined scheduling type. For example, when the scheduling type is determined to be the interrupt type, the processor 120 may output a voice and/or a graphic indicating that the first task currently processed is interrupted and the second task corresponding to the interrupt is processed. In another example, when the scheduling type is determined to be the merge type, the processor 120 may output a voice and/or a graphic indicating that the first task currently processed is temporarily interrupted and the second task corresponding to the interrupt is processed, or that the first task currently processed and the second task are processed simultaneously. In still another example, when the scheduling type is determined to be the delay type, the processor 120 may output a voice and/or a graphic indicating that the second task corresponding to the interrupt is delayed to be processed due to the first task currently processed. In yet another example, when the scheduling type is determined to be the reject type, the processor 120 may output a voice and/or a graphic indicating that the second task corresponding to the interrupt cannot be processed due to the first task currently processed and the scheduled third task.

Figure 2:
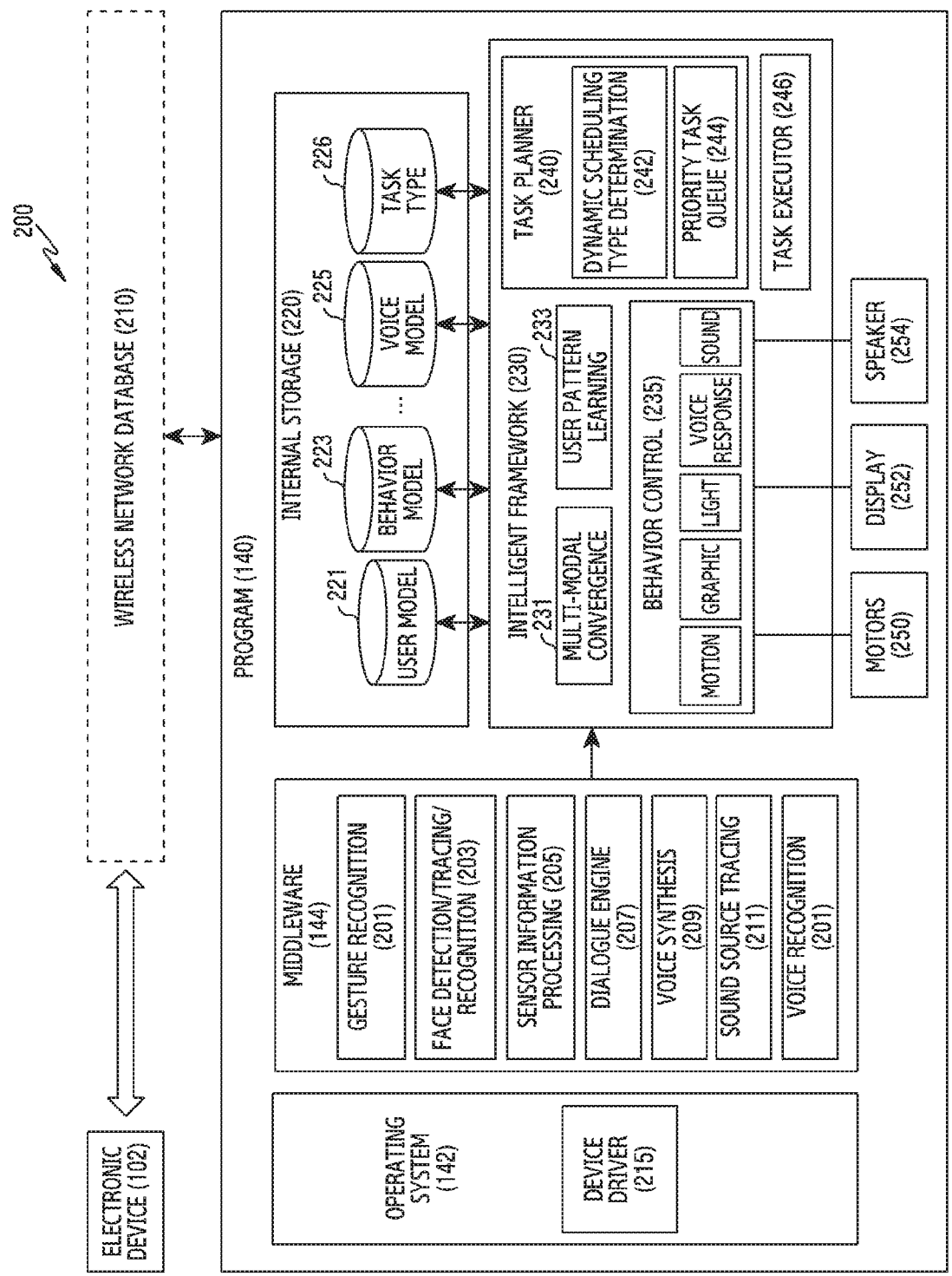
FIG. 2 illustrates a block diagram of a program in the electronic device according to various embodiments.

FIG. 2 illustrates a block diagram 200 of the program 140 in the electronic device 101 according to various embodiments. The program 140 in FIG. 2 may be at least part of the program 140 of FIG. 1. Referring to FIG. 2, the program 140 of the electronic device 101 may include an operating system 142 to control one or more resources of the electronic device, middleware 144, an intelligent framework 230, or an internal storage 220. The operating system 142 may include, for example, Android™, iOS™, Windows™, Symbian™, Tizen™, or Bada™. At least part of software programs may be preloaded in the electronic device 101 at the time of manufacturing, or may be downloaded from an external electronic device (for example, the electronic device 102 or the server 108) or refined when it is used by the user.

The operating system 142 may control management (for example, allocation or collection) of one or more system resources (for example, a process, a memory, or a power source) of the electronic device. Additionally or alternatively, the operating system 142 may include one or more device driver 215 programs to drive other hardware devices of the electronic device 101, for example, an input device (for example, the input device 150 of FIG. 1), a sound output device (for example, the sound output device 155 of FIG. 1), a display device (for example, the display device 160 of FIG. 1), a behavior module (for example, the behavior module 163 of FIG. 1), a camera module (for example, the camera module 180 of FIG. 1), a power management module (for example, the power management module 188 of FIG. 1), a battery (for example, the battery 189 of FIG. 1), a communication module (for example, the communication module 190 of FIG. 1), a subscriber identification module (for example, the subscriber identification module 196 of FIG. 1), or an antenna module (for example, the antenna module 197 of FIG. 1).

The middleware 144 may detect and trace a location of the face of the user by using signal-processed data, or may authenticate through face recognition. The middleware may perform roles of recognizing a 3D gesture of the user, tracing an input location regarding an audio signal (Direct of Arrival (DOA)), recognizing a voice, and processing signals of various sensor data. The middleware 144 may include, for example, a gesture recognition manager 201, a face detection/tracing/recognition manager 203, a sensor information processing manager 205, a dialog engine manager 207, a voice synthesis manager 209, a sound source tracing manager 211, or a voice recognition manger 213.

The internal storage 220 may include, for example, a user model database (DB) 221, a behavior model DB 223, a voice model DB 225, or a task type DB 226. The user model DB 221 may store, for example, information learned at the intelligent framework 230 according to each user. The behavior model DB 223 may store, for example, information for controlling behaviors of the electronic device 101. The voice model DB 225 may store, for example, information for a voice response of the electronic device 101. The task type DB 226 may store, for example, type information of each task. According to an embodiment, information stored in the respective DBs may be stored in or shared by a wireless network DB 210 (for example, cloud).

The intelligent framework 230 may include, for example, a multi-modal convergence block 231, a user pattern learning block 233, a behavior control block (behavior controller) 235, a task planner 240, or a task executor 246. The multi-modal convergence block 231 may collate and manage a variety of information processed at the middleware 144. The user pattern learning block 233 may extract and learn meaningful information such as a life pattern, preference, etc. of the user by using information of the multi-modal convergence block 231. According to an embodiment, the user pattern learning block 233 may learn information on the number (cumulative number) of times a command is received from each user, or a time (cumulative time) spent interacting (mutually communicating) according to a command and/or an event of each user. The user pattern learning block 233 may determine an affinity of each user based on the information on the number of times of learning and/or the time, and may store the affinity in the internal storage 220. The behavior control block 235 may express information to be fed back to the user in the form of a motion, a graphic (UI/UX), light, a voice response, or a sound through at least one of motors 250, a display 252, or a speaker 254.

The task planner 240 may determine a scheduling type of the plurality of tasks, and may control to process the tasks according to the determined scheduling type. According to an embodiment, the task planner 240 may include a dynamic task scheduling type determination block 242 to determine a scheduling type of the plurality of tasks, and a priority task queue 244 to manage the plurality of tasks based on the determined scheduling type. When an interrupt requesting processing of the second task occurs in the middle of processing the first task, the dynamic task scheduling type determination block 242 may determine a scheduling type for determining a processing order of the plurality of tasks, including the first task which is being processed, the second task corresponding to the interrupt, and/or the at least one scheduled third task. According to an embodiment, the dynamic task scheduling type determination block 242 may dynamically determine the scheduling type based on learning information (for example, an affinity) stored according to each user, a task type of each of the plurality of tasks, a performing time of each of the plurality of tasks, or a remaining battery of the battery. According to an embodiment, the priority task queue 244 may manage the first task which is being executed, the second task requested to be executed by the interrupt, and/or the scheduled third task. The priority task queue 244 may determine a priority of each of the plurality of tasks based on the task scheduling type.

The task executor 246 may process a task provided from the priority task queue 244 based on the priority. For example, the task executor 246 may perform at least one action, or a plurality of sequence actions included in the corresponding task.

According to various embodiments, an electronic device (for example, the electronic device 101 of FIG. 1) may include a processor (for example, the processor 120) and a memory (for example, the memory 130 of FIG. 1) a memory operatively connected to the processor. The when being executed, the memory 130 may store instructions that cause the processor 120 to: detect occurrence of an interrupt requesting performance of a second task while performing a first task; obtain reference values according to a time of the first task, and reference values according to a time of the second task; schedule the first task and the second task based on a reference value of the first task and a reference value of the second task which correspond to a time at which the interrupt occurs; and process the first task and the second task based on a result of the scheduling.

According to various embodiments, the instructions may cause the processor to: obtain the reference values according to the time of the first task, based on at least one of an affinity of a user related to the first task or a type of the first task; and obtain the reference values according to the time of the second task, based on at least one of an affinity of a user related to the second task or a type of the second task.

According to various embodiments, the affinity of the user may be determined based on at least one of a number of times a command is received from the user, or a time spent interacting with the user.

According to various embodiments, the reference values according to the time of the first task may be expressed by a function a value of which changes over time, or fixed constant values, and the reference values according to the time of the second task may be expressed by a function a value of which changes over time, or fixed constant values.

According to various embodiments, the instructions may cause the processor 120 to schedule the first task and the second task, further based on at least one of a remaining time to perform the first task, a total time required to perform the second task, or a remaining capacity of a battery of the electronic device.

According to various embodiments, the instructions may cause the processor 120 to: compare the reference value of the first task corresponding to the time at which the interrupt occurs, and the reference value of the second task corresponding to the time at which the interrupt occurs; and determine a scheduling type for the first task and the second task based on a result of the comparing.

According to various embodiments, the scheduling type may include at least one of an interrupt type according to which processing of the first task is interrupted and the second task is processed, a merge type according to which processing of the first task is temporarily interrupted and then the second task is processed, and processing of the first task is resumed when processing of the second task is completed, a delay type according to which processing of the first task is completed and then the second task is processed, or a reject type according to which processing of the second task is rejected and the first task is processed.

According to various embodiments, the instructions may cause the processor 120 to: when the reference value of the first task is smaller than the reference value of the second task as the result of the comparing, determine whether an attribute of the first task is a designated attribute; when the attribute of the first task is the designated attribute, determine the scheduling type to be the merge type, and, when the attribute of the first task is not the designated attribute, determine the scheduling type to be the interrupt type.

According to various embodiments, the instructions cause the processor 120 to: when the reference value of the first task is larger than the reference value of the second task as the result of the comparing, determine an estimated time of completion of processing of the first task and the second task; determine whether there exists a third task scheduled to start before the estimated time of the completion of the processing; when there does not exist the third task scheduled to start before the estimated time of the completion of the processing, determine the scheduling type to be the delay type; and, when there exists the third task scheduled to start before the estimated time of the completion of the processing, determine the scheduling type to be any one of the delay type or the reject type, further based on a reference value according to a time of the third task.

According to various embodiments, the instructions may cause the processor 120 to: when there exists the third task scheduled to start before the estimated time of the completion of the processing, compare a reference value of the second task and a reference value of the third task which correspond to an scheduled start time of the third task; when the reference value of the third task is larger than or equal to the reference value of the second task, determine the scheduling type to be the reject type; and, when the reference value of the second task is smaller than the reference value of the third task, determine the scheduling type to be the delay type.

According to various embodiments, the instructions may cause the processor to: determine a battery charging start time based on a remaining capacity of the battery of the electronic device; and, when the charging start time is before the estimated time of the completion of the processing of the first task and the second task, determine that there exists the third task scheduled to start before the estimated time of the completion of the processing.

Figure 3:
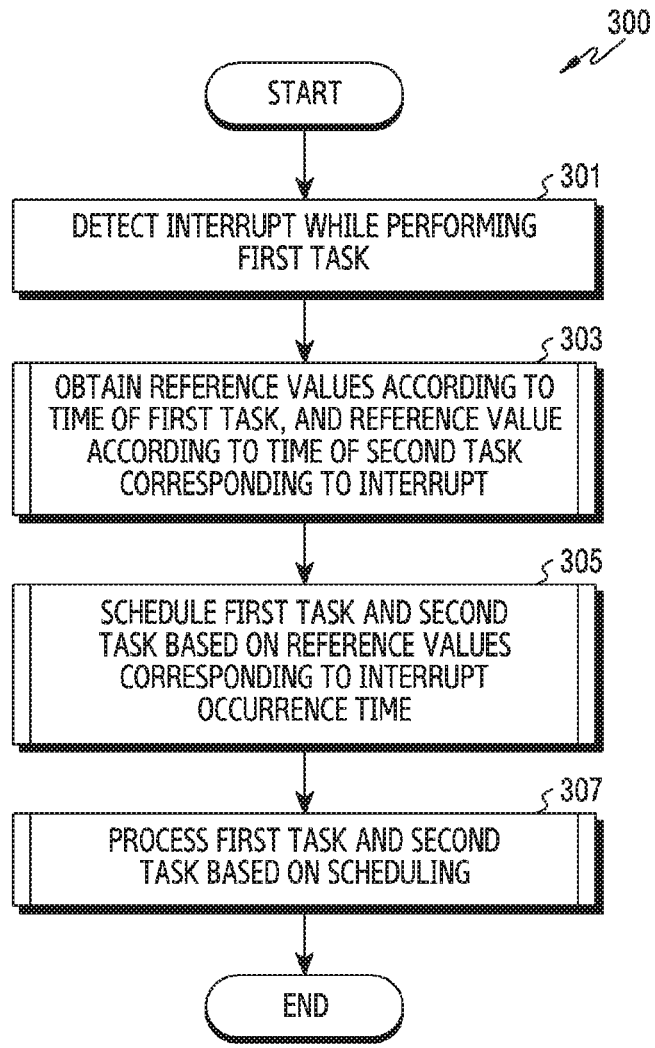
FIG. 3 illustrates a flowchart for processing a plurality of tasks in an electronic device according to various embodiments.
Figure 4:
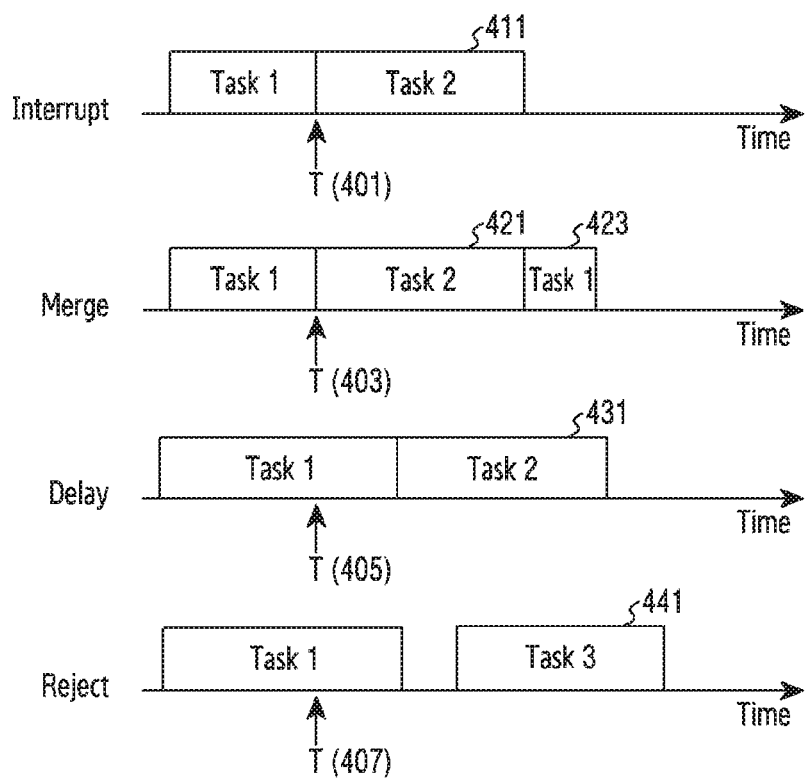
FIG. 4 is a view illustrating scheduling types for a plurality of tasks according to various embodiments.

FIG. 3 illustrates a flowchart 300 for processing a plurality of tasks in an electronic device according to various embodiments. In the following embodiment, respective operations may be performed in sequence, but may not necessarily be performed in sequence. For example, an order of the respective operations may be changed, and at least two operations may be performed in parallel. Herein, the electronic device may be the electronic device 101 of FIG. 1. Hereinafter, at least some of the operations of FIG. 3 will be described with reference to FIG. 4. FIG. 4 is a view illustrating scheduling types of a plurality of tasks according to various embodiments.

Referring to FIG. 3, in operation 301, the electronic device (for example, the processor 120 of FIG. 1) according to various embodiments may detect an interrupt in the middle of performing a first task. According to an embodiment, the processor 120 may detect an interrupt requesting performance of a second task while performing the first task based on a command and/or an event from a first user. The interrupt may be detected when a command is received from the first user or a second user, or an event occurs. The event may include, for example, at least one of a call-related event, an alarm event, or a designated event.

According to various embodiments, in operation 303, the electronic device (for example, the processor 120) may obtain reference values according to a time of the first task, and reference values according to a time of the second task corresponding to the interrupt. According to an embodiment, the processor 120 may determine the reference values according to the time of the first task, based on at least one of a user affinity corresponding to the first task, or a type of the first task, and may determine the reference values according to the time of the second time based on at least one of a user affinity corresponding to the second task, or a type of the second task. The reference values according to the time of the first task, and/or the reference values according to the time of the second task may be determined in the form of a function the value of which changes over time, or may be determined in the form of a constant which is fixed regardless of time. For example, the processor 120 may determine a reference value of each task by using a function which uses an affinity of a user corresponding to the task and a type of the task as parameters. For example, the processor 120 may determine a reference value of each task simply by multiplying a digitized task type and a digitized affinity. Each task type may be expressed in the form of a constant or in the form of a function the value of which changes over time, and may be pre-stored in the electronic device (for example, the memory 130). An affinity of a user may be determined based on at least one of the number of times (cumulative number of times) a command is received from the corresponding user, or a time (or cumulative time) spent interacting (or communicating) with the corresponding user according to a command from the corresponding user and/or an event. For example, an affinity of a user who commands the electronic device many times, and spends a long time interacting with the electronic device may be determined to be high.

According to various embodiments, in operation 305, the electronic device (for example, the processor 120) may schedule the first task and the second task based on reference values corresponding to a time at which the interrupt occurs. According to an embodiment, the processor 120 may compare a reference value of the first task and a reference value of the second task corresponding to the time at which the interrupt occurs, and may determine a scheduling type based on a result of comparing. For example, as shown in FIG. 4, the scheduling type may include at least one of an interrupt type, a merge type, a delay type, or a reject type. The interrupt type may be a type according to which, when the interrupt requesting processing of the second task occurs at a first time 401 while the first task is being performed, processing of the first task is interrupted and the second task is processed (411). The merge type is a type according to which, when the interrupt requesting processing of the second task occurs at a first time 403 while the first task is being performed, processing of the first task is temporarily interrupted, the second task is processed (421), and then processing of the first task is resumed (423), or the first task and the second task are processed simultaneously (421, 423). Processing the first task and the second task simultaneously may refer to starting the processing of the second task from the time at which the interrupt occurs, while processing the first task. According to an embodiment, in the merge type, at least one of the first task and the second task may be processed in a background mode. The delay type may be a type according to which, when the interrupt requesting processing of the second task occurs at a first time 405 while the first task is being performed, a time to process the second task is delayed to a time after processing of the first task is completed. For example, the delay type may be a type according to which the second task is processed 431 after processing of the first task is completed. The reject type may be a type according to which the second task is not processed. For example, the reject type may be a type according to which, when the interrupt requesting processing of the second task occurs at a first time 407 while the first task is being performed, the electronic device rejects processing of the second task in order to process the first task and/or a scheduled third task (441), and notifies the user of the rejection of processing of the second task. According to an embodiment, the processor 120 may determine a scheduling type by further considering at least one of a time required to perform the first task a remaining time to perform the first task, a total time required to perform the second task, or a remaining capacity of the battery.

According to various embodiments, in operation 307, the electronic device (for example, the processor 120) may process the first task and the second task based on a scheduling result. According to an embodiment, the processor 120 may control a display device (for example, the display device 160 of FIG. 1) and/or a sound output device (for example, the sound output device 155 of FIG. 1) to provide the determined scheduling result to the user in the form of a voice and/or a graphic, and may process the first task and/or the second task based on the scheduling result. For example, when the scheduling type is determined to be the interrupt type, the processor 120 may control to output a voice and/or a graphic indicating that the first task currently processed is interrupted and the second task corresponding to the interrupt is processed through the display device 160 and/or the sound output device 155, and may interrupt processing of the first task and may process the second task. In another example, when the scheduling type is determined to be the merge type, the processor 120 may control to output a voice and/or a graphic indicating that the first task currently processed is temporarily interrupted and the second task corresponding to the interrupt is processed, or indicating that the first task currently processed and the second task are processed simultaneously through the display device 160 and/or the sound output device 155. The processor 120 may temporarily interrupt processing of the first task and may process the second task. In still another example, when the scheduling type is determined to be the delay type, the processor 120 may control to output a voice and/or a graphic indicating that the second task corresponding to the interrupt is delayed to be processed due to the first task currently processed through the display 160 and/or the sound output device 155, and may continue processing the first task. When processing of the first task is completed, the processor 120 may process the second task. In yet another example, when the scheduling type is determined to be the reject type, the processor 120 may control to output a voice and/or a graphic indicating that the second task corresponding to the interrupt cannot be processed due to the first currently processed and the scheduled third task through the display device 160 and/or the sound output device 155, and may continue processing the first task.

Figure 5A:
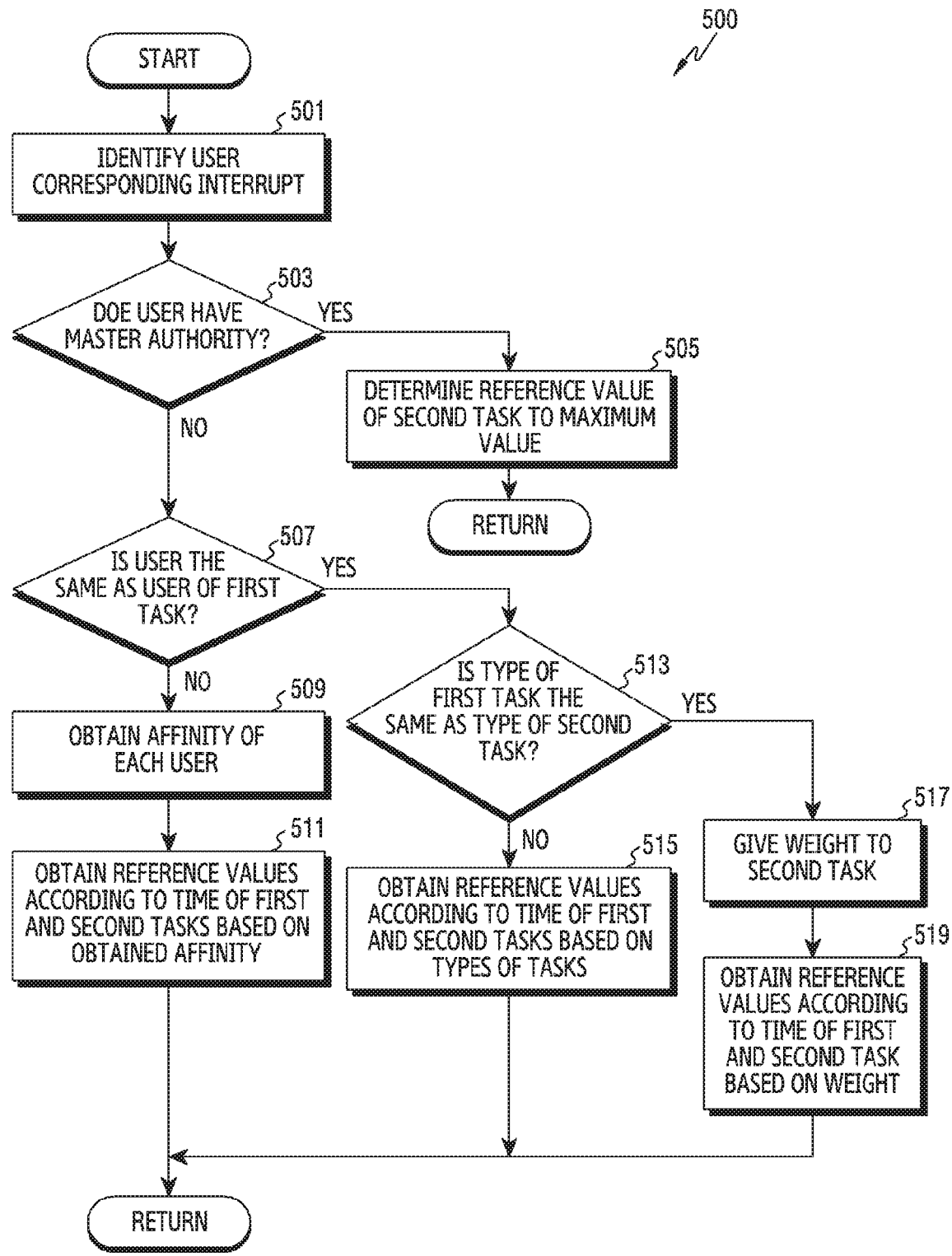
FIG. 5A illustrates a flowchart for determining a reference value of a task in an electronic device according to various embodiments.
Figure 5B:
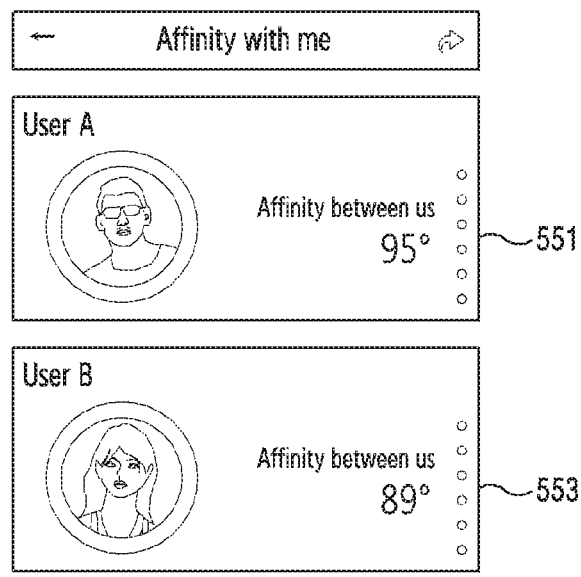
FIG. 5B illustrates a screen configuration diagram providing an affinity of a user in the electronic device according to various embodiments.

FIG. 5A illustrates a flowchart 500 for determining a reference value of a task in an electronic device according to various embodiments. Operations of FIG. 5A which will be described hereinbelow may be at least part of the specific operations of operation 303 of FIG. 3. In the following embodiment, respective operations may be performed in sequence, but may not necessarily be performed in sequence. For example, an order of the respective operations may be changed, and at least two operations may be performed in parallel. Herein, the electronic device may be the electronic device 101 of FIG. 1. Hereinafter, at least some of the operations of FIG. 5A will be described with reference to FIG. 5B. FIG. 5B illustrates a screen configuration diagram providing a user's affinity in the electronic device according to various embodiments.

Referring to FIG. 5A, in operation 501, the electronic device (for example, the processor 120 of FIG. 1) according to various embodiments may identify a user corresponding to an interrupt. According to an embodiment, the processor 120 may identify the user based on a voice command of the user corresponding to the interrupt. For example, when the interrupt is detected by receiving the voice command, the processor 120 may identify the user by obtaining voice print information from the received voice command. The voice print information is information which visualizes a resonance frequency of a user voice, and may include information based on anatomical features (for example, an amplitude of a voice frequency, a slope of a voice spectrum), and/or a user's behavior pattern (for example, a voice pitch, a speaking style). In another example, when the interrupt is detected by a pre-set alarm, the processor 120 may identify the user based on information of the user already registered as having requested alarm setting in advance. For example, when a voice command to request alarm setting is received, the processor 120 may analyze the received voice command and may obtain user identification information, and may map and register the user identification information at the time of setting the requested alarm.

According to various embodiments, in operation 503, the electronic device (for example, the processor 120) may determine whether the identified user is a user of a master authority. According to an embodiment, the processor 120 may determine whether a user registered as having a master authority of the electronic device, and the user corresponding to the interrupt are the same as each other. According to an embodiment, the user of the master authority may be pre-set through an authentication process.

According to various embodiments, when the identified user is the user of the master authority, the electronic device (for example, the processor 120) may determine a reference value of a second task corresponding to the interrupt to a maximum value in operation 505. For example, the processor 120 may determine a reference value of a task occurred by the user of the master authority to a maximum value, such that the task of the command and/or event of the user of the master authority is performed always in preference to tasks of commands and/or events of other users. In another example, the processor 120 may fix an affinity of the user of the master authority to a maximum value, and may determine a reference value based on the affinity of the maximum value, such that the task of the command and/or event of the user of the master authority is performed always in preference to the tasks of the commands and/or the events of other users.

According to various embodiments, when the identified user is not the user of the master authority, the electronic device (for example, the processor 120) may determine whether the identified user and a user of a first task are the same as each other in operation 507. For example, the processor 120 may determine whether the user corresponding to the first task currently processed at the time when the interrupt occurs, and the user corresponding to the interrupt are the same user. The user corresponding to the first task may be already identified based on a voice command of the user requesting processing of the first task.

According to various embodiments, when the identified user and the user of the first task are not the same, the electronic device (for example, the processor 120) may obtain an affinity of the user of the first task and an affinity of the user of the second task in operation 509. For example, when the user corresponding to the first task and the user corresponding to the second task are different from each other, the processor 120 may obtain the affinity of the user corresponding to the first task and the affinity of the user corresponding to the second task. The affinity of each user may be determined based on at least one of the number of times (or cumulative number of times) a command is received from the corresponding user, or a time (or cumulative time) spent interacting (or mutually communicating) with the corresponding user according to a command and/or an event. For example, the processor 120 may determine an affinity of a user who commands the electronic device 101 many times, and spends a long time interacting among a plurality of users to be high. The affinity of each user may be refined in real time every time a command is received from the corresponding user, or every time the interacting time increases. The processor 120 may control a display device (for example, the display device 160 of FIG. 1) to provide the affinity of each user refined in real time through a user interface as shown in FIG. 5B. For example, the processor 120 may display a graphic 551 indicating that the affinity of a user A is 95 degrees, and a graphic 553 indicating that the affinity of a user B is 89 degrees on a screen.

According to various embodiments, in operation 511, the electronic device (for example, the processor 120) may obtain reference values according to the time of the first task, and reference values according to the time of the second task, based on the affinities of the respective users obtained. According to an embodiment, the processor 120 may obtain reference values according to the time of the first task based on the affinity of the user of the first task, and may obtain reference values according to the time of the second task based on the affinity of the user of the second task. According to an embodiment, the processor 120 may obtain reference values according to the time of the first task based on the affinity of the user of the first task and a type of the first task, and may obtain reference values according to the time of the second task based on the affinity of the user of the second task and a type of the second task. For example, the processor 120 may determine reference values of each task by using a function which receives input of a user's affinity and a type of the task as parameters. For example, the processor 120 may obtain a constant or a function corresponding to the type of the first task from a memory (for example, the memory 130 of FIG. 1), and may obtain the reference values according to the time of the first task simply by multiplying the obtained constant or function and the user affinity of the first task.

According to various embodiments, when the identified user and the user of the first task are the same as each other, the electronic device (for example, the processor 120) may determine whether a type of the first task and a type of the second task are the same as each other in operation 513.

According to an embodiment, when the user corresponding to the first task and the user corresponding to the second task are the same as each other, the processor 120 may determine that the user affinity of the first task and the user affinity of the second task do not influence determination of a scheduling type, and may determine whether the type of the first task and the type of the second task are the same as each other by comparing the types.

According to various embodiments, when the type of the first task and the type of the second task are not the same as each other, the electronic device (for example, the processor 120) may obtain reference values according to the time of the first task and reference values according to the time of the second task based on the task types in operation 515. According to an embodiment, the processor 120 may obtain reference values according to the time of the first task based on the type of the first task, and may obtain reference values according to the time of the second task based on the type of the second task. For example, the processor 120 may determine reference values of each task by using a function which receives input of a type of a task as a parameter. For example, the processor 120 may obtain a constant or a function corresponding to the type of the first task from the memory (for example, the memory 130 of FIG. 1), and may obtain reference values according to the time of the first task.

According to various embodiments, when the type of the first task and the type of the second task are the same as each other, the electronic device (for example, the processor 120) may give a weight to the second task in operation 517. According to an embodiment, when the user of the first task and the user of the second task are the same as each other and the type of the first task and the type of the second task are the same as each other, the processor 120 may determine that the second task occurred at a later time reflects a user's intention higher than the first task, and may give a weight to the second task such that the second task has a larger reference value.

According to various embodiments, the electronic device (for example, the processor 120) may obtain reference values according to the time of the first task and reference values according to the time of the second task based on the weight in operation 519. According to an embodiment, the processor 120 may obtain the reference values according to the time of the first task based on the type of the first task, and may obtain the reference values according to the time of the second task based on the type of the second task and the weight.

Figure 6:
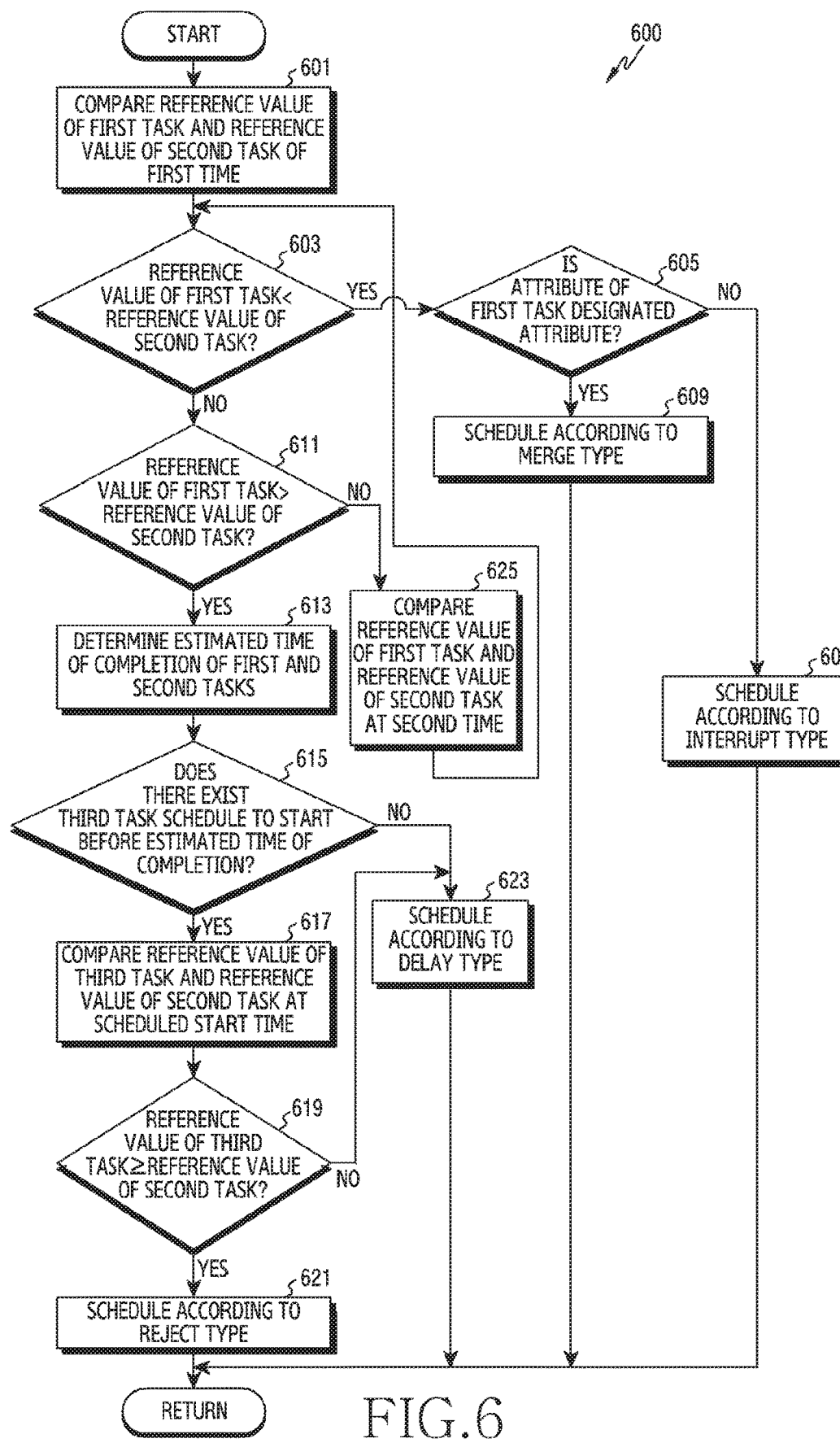
FIG. 6 illustrates a flowchart for determining a scheduling type of a plurality of tasks in an electronic device according to various embodiments.

FIG. 6 illustrates a flowchart 600 for determining a scheduling type of a plurality of tasks in an electronic device according to various embodiments. Operations of FIG. 6 which will be described hereinbelow may be at least part of the specific operations of operations 305 and 307 of FIG. 3. In the following embodiment, respective operations may be performed in sequence, but may not necessarily be performed in sequence. For example, an order of the respective operations may be changed, and at least two operations may be performed in parallel. Herein, the electronic device may be the electronic device 101 of FIG. 1. Hereinafter, at least some of the operations of FIG. 6 will be described with reference to FIG. 7A, 7B, 7C, 7D, 7E. FIGS. 7A, 7B, 7C, 7D, 7E are views of an example of determining a scheduling type based on reference values of a plurality of tasks in the electronic device according to various embodiments.

Referring to FIG. 6, according to various embodiments, in operation 601, the electronic device (for example, the processor 120 of FIG. 1) may compare a reference value of a first task and a reference value of a second task which correspond to a first time at which an interrupt occurs. For example, the processor 120 may obtain the reference value of the first task corresponding to the first time at which the interrupt occurs, and the reference value of the second task corresponding to the first time, from the reference values according to the time of the first task and the reference values according to the time of the second task, which are obtained in operation 303 of FIG. 3, and may compare the reference values.

According to various embodiments, in operation 603, the electronic device (for example, the processor 120) may determine whether the reference value of the first task is smaller than the reference value of the second task. For example, the processor 120 may determine whether the reference value of the first task is smaller than the reference value of the second task, based on a result of comparing in operation 601.

According to various embodiments, when the reference value of the first task is smaller than the reference value of the second task, the electronic device (for example, the processor 120) may determine whether an attribute of the first task corresponds to a designated attribute in operation 605. According to an embodiment, the processor 120 may determine whether an attribute of at least one action included in the first task has a designated attribute. The designated attribute may include an attribute of a task that provides a meaningful result to a user only when the task is performed to the end even if the task is temporarily interrupted and is re-executed. For example, when the first task is a task for going to a study room and delivering a message asking A to have a dinner, the first task may include a first action of causing the electronic device to go to the study room, and a second action of causing the electronic device to deliver the message asking A to have the dinner. When performance of the second action is completed, the processor 120 may provide a meaningful result to the user. Therefore, the task may be determined to have the designated attribute. The designated attribute may be pre-set by a designer and/or the user, or may be determined by learning. In another example, when the first task is a task for playing B music, the first task may include a first action of causing the electronic device to start playing the B music, and a second action of causing the electronic device to keep playing the B music from a start time of the B music to an end time. The processor 120 may provide a meaningful result to the user even when performance of the second action is not completed. Therefore, the task may be determined not to have the designated attribute. For example, even when only the first action of starting the playing of the B music is completed, the processor 120 may determine to provide a meaningful result to the user, and may determine that the first task of playing the B music does not correspond to the designated attribute.

Figure 7A:
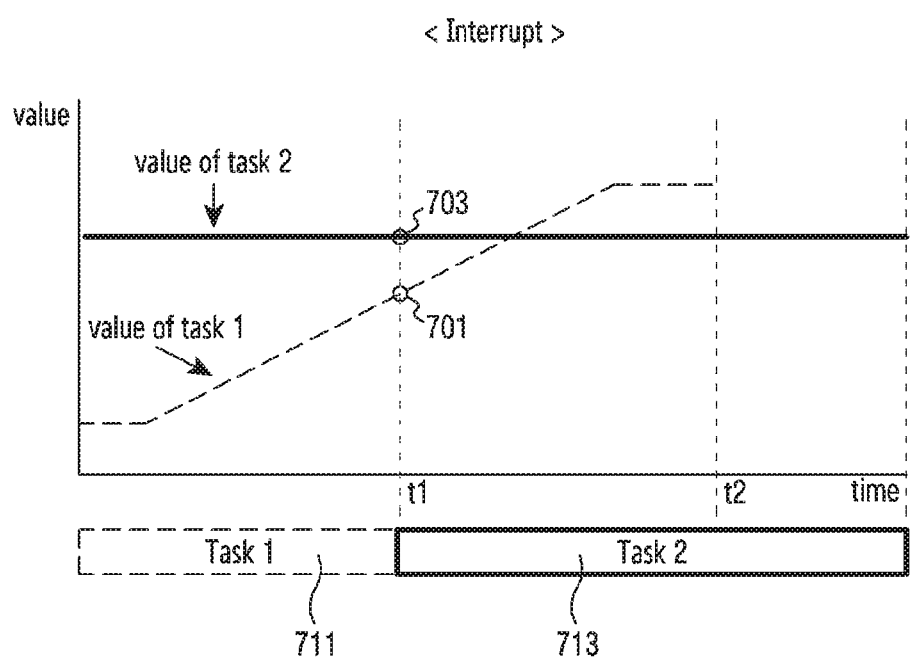
FIG. 7A is a view illustrating an example of determining a scheduling type based on reference values of the plurality of tasks in the electronic device according to various embodiments.

According to various embodiments, when the attribute of the first task is not the designated attribute, the electronic device (for example, the processor 120) may determine a scheduling type of the first task and the second task to be the interrupt type in operation 607. According to an embodiment, when the reference value of the first task corresponding to the first time is smaller than the reference value of the second task corresponding to the first time, and the attribute of the first task is not the designated attribute, the processor 120 may determine the scheduling type to be the interrupt type. For example, as shown in FIG. 7A, the processor 120 may detect occurrence of an interrupt requesting processing of the second task at a first time t1 while processing the first task (711). When a reference value 701 of the first task at the first time t1 is smaller than a reference value 703 of the second task at the first time t1, and the attribute of the first task is not the designated attribute, the processor 120 may determine the scheduling type to be the interrupt type, and may interrupt processing of the first task (711) and may control the second task to be processed (713). The processor 120 may control a display device (for example, the display device 160 of FIG. 1) and/or a sound output device (for example, the sound output device 155 of FIG. 1) to output a voice and/or graphic indicating that the first task currently processed is interrupted and the second task corresponding to the interrupt is processed.

Figure 7B:
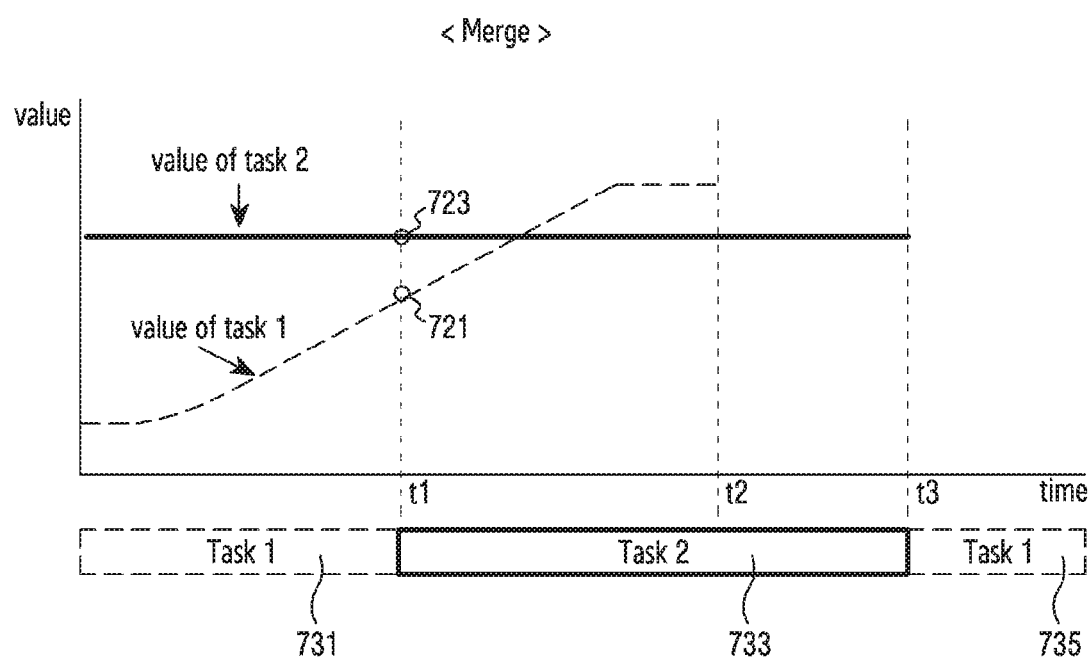
FIG. 7B is a view illustrating an example of determining a scheduling type based on reference values of the plurality of tasks in the electronic device according to various embodiments.

According to various embodiments, when the attribute of the first task is the designated attribute, the electronic device (for example, the processor 120) may determine the scheduling type for the first task and the second task to be the merge type in operation 609. According to an embodiment, when the reference value of the first task corresponding to the first time is smaller than the reference value of the second task corresponding to the first time, and the attribute of the first task is the designated attribute, the processor 120 may determine the scheduling type to be the merge type. For example, as shown in FIG. 7B, the processor 120 may detect occurrence of an interrupt requesting processing of the second task at the first time t1 while processing the first task (731). When a reference value 721 of the first task at the first time t1 is smaller than a reference value 723 of the second task at the first time t1, and the attribute of the first task is the designated attribute, the processor 120 may determine the scheduling type to be the merge type, and may temporarily interrupt processing of the first task (731) and may control the second task to be processed (733). The processor 120 may resume processing of the first task (735) which has been interrupted, after completing processing of the second task (733). The processor 120 may control the display device 160 and/or the sound output device 155 to output a voice and/or a graphic indicating that the first task currently processed is temporarily interrupted and the second task corresponding to the interrupt is processed, or indicating that the first task currently processed and the second task are processed simultaneously.

According to various embodiments, when the reference value of the first task is not smaller than the reference value of the second task, the electronic device (for example, the processor 120) may determine whether the reference value of the first task is larger than the reference value of the second task in operation 611. For example, based on the result of comparing in operation 601, the processor 120 may determine whether the reference value of the first task is larger than the reference value of the second task or the reference value of the first task is equal to the reference value of the second task.

According to various embodiments, when the reference value of the first task is larger than the reference value of the second task, the electronic device (for example, the processor 120) may determine an estimated time of completion of the first task and the second task. For example, the processor 120 may determine an estimated time of completion of processing of the first task and the second task when both the first task and the second task are processed. According to an embodiment, the processor 120 may calculate a time when performance of the first task and the second task is completed, based on a remaining time to perform the first task and a total time required to perform the second task. According to an embodiment, a total time required to perform each task, or a remaining time to perform each task may be already determined based on actions included in the corresponding task, or may be estimated times, and may be refined by learning. For example, the time required to perform the first task may be learned and refined by repeatedly performing the first task.

According to various embodiments, in operation 615, the electronic device (for example, the processor 120) may determine whether there exists a third task scheduled to start before the estimated time of completion of the first task and the second task. According to an embodiment, the processor 120 may determine whether there exists a task scheduled to be performed at a time between the interrupt occurrence time and the estimated time of completion, among tasks pre-scheduled (registered) at the memory (for example, the memory 130 of FIG. 1). For example, it is determined that the interrupt occurrence time is 10:03 AM, and the estimated time of completion of the first task and the second task is 10:21 AM, the processor 120 may determine whether there exists a third task scheduled to be processed between 10:03 AM and 10:21 AM. According to an embodiment, the processor 120 may determine whether there exists the third task schedule to be processed before the estimated time of completion of the first task and the second task, based on a remaining capacity of the battery. For example, the processor 120 may determine a battery charging start time based on the remaining capacity of the battery, and, when the battery charging start time is before the estimated time of completion of the first task and the second task, the processor 120 may determine that there exists the third task schedule to be processed within the estimated time of completion of the first task and the second task.

Figure 7C:
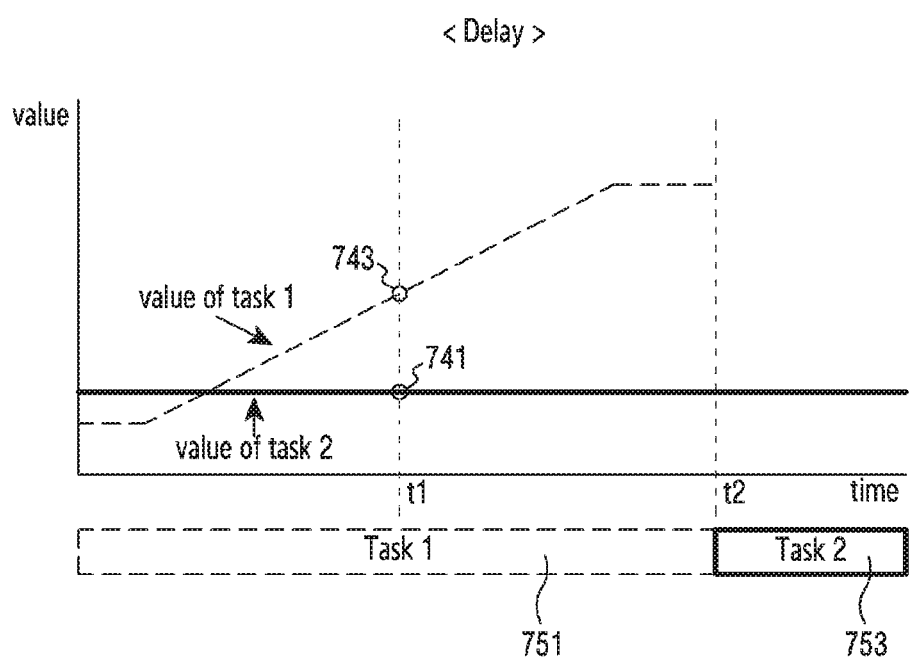
FIG. 7C is a view illustrating an example of determining a scheduling type based on reference values of the plurality of tasks in the electronic device according to various embodiments.

According to various embodiments, when there does not exist the third task schedule to start before the estimated time of completion of the first task and the second task, the electronic device (for example, the processor 120) may determine the scheduling type for the first task and the second task to be the delay type in operation 623. According to an embodiment, when the reference value of the first task corresponding to the first time is larger than the reference value of the second task corresponding to the first time, and there does not exist the third task scheduled to be processed within the estimated time of completion of the first task and the second task, the processor 120 may determine the scheduling type to be the delay time. For example, as shown in FIG. 7C, the processor 120 may detect occurrence of an interrupt requesting processing of the second task at the first time t1 while processing the first task (751). When a reference value 743 of the first task at the first time t1 is larger than a reference value 741 of the second task at the first time t1, and there does not exist the third task scheduled to be processed before the estimated time of completion, the processor 120 may determine the scheduling type to be the delay time, and may continue processing the first task (751), and, when processing of the first task (751) is completed, the processor 120 may control the second task to be processed (753). The processor 120 may control the display device 160 and/or the sound output device 155 to output a voice and/or graphic indicating that the second task corresponding to the interrupt is delayed to be processed due to the first task currently processed.

According to various embodiments, when there exists the third task scheduled to start before the estimated time of completion of the first task and the second task, the electronic device (for example, the processor 120) may compare a reference value of the third task and a reference value of the second task corresponding to a scheduled start time of the third task in operation 617. For example, the processor 120 may compare a reference value of the third task and a reference value of the third task corresponding to a processing start time of the scheduled third task.

Figure 7D:
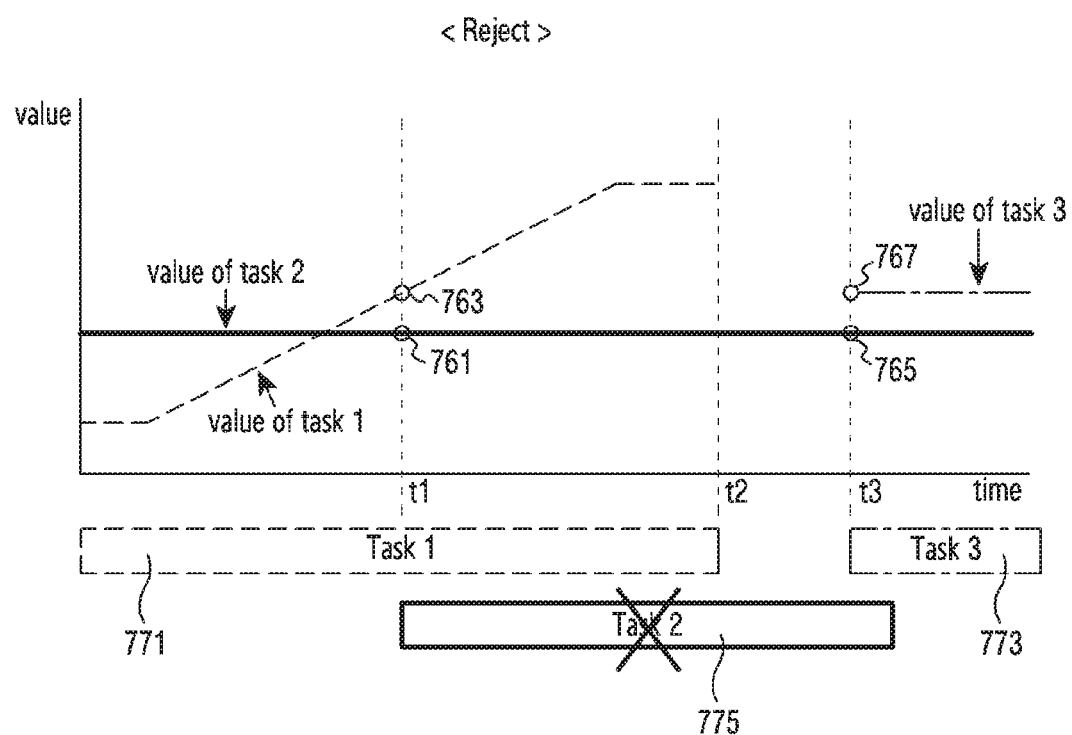
FIG. 7D is a view illustrating an example of determining a scheduling type based on reference values of the plurality of tasks in the electronic device according to various embodiments.

According to various embodiments, in operation 619, the electronic device (for example, the processor 120) may determine whether the reference value of the third task is larger than or equal to the reference value of the second task. According to various embodiments, when the reference value of the third task is larger than or equal to the reference value of the second task, the electronic device (for example, the processor 120) may determine the scheduling type for the first task and the second task to be the reject type in operation 621. According to an embodiment, when the third task schedule to be processed within the estimated time of completion of the first task and the second task has a reference valuer higher than the reference value of the second task at the scheduled time, the processor 120 may determine the scheduling type to be the reject type. For example, as shown in FIG. 7D, the processor 120 may detect occurrence of an interrupt requesting processing of the second task at the first time t1 while processing the first task (771). When a reference value 763 of the first task at the first time t1 is larger than a reference value 761 of the second task at the first time t1, there exists a third task 773 scheduled to be processed before the estimated time of completion, and a reference value 767 of the third task 773 corresponding to a scheduled time t3 of the third task 773 is larger than a reference value 765 of the second task, the processor 120 may determine the scheduling type to be the reject type, and may continue processing the first task (771) and may reject processing of the second task (775). For example, the processor 120 may control the display device 160 and/or the sound output device 155 to output a voice and/or a graphic indicating that the second task corresponding to the interrupt cannot be processed due to the first task currently processed and the scheduled third task.

According to various embodiments, when the reference value of the third task is smaller than the reference value of the second task, the electronic device (for example, the processor 120) may determine the scheduling type for the first task and the second task to be the delay type in operation 623. For example, when the third task scheduled to be processed within the estimated time of completion of the first task and the second task has a reference value smaller than the reference value of the second task at the scheduled time, the processor 120 may determine the scheduling type to be the delay type. The processor 120 may continue processing the first task, and, when processing of the first task is completed, the processor 120 may control the second task to be processed. The processor 120 may control the display device 160 and/or the sound output device 155 to output a voice and/or a graphic indicating that the second task corresponding to the interrupt is delayed to be processed due to the first task currently processed. When an interrupt is detected at the scheduled time of the third task in the middle of processing the second task, the processor 120 may perform at least some of the operations of FIG. 3, FIG. 5A, and/or FIG. 6 again to determine a scheduling type for the second task and the third task.

Figure 7E:
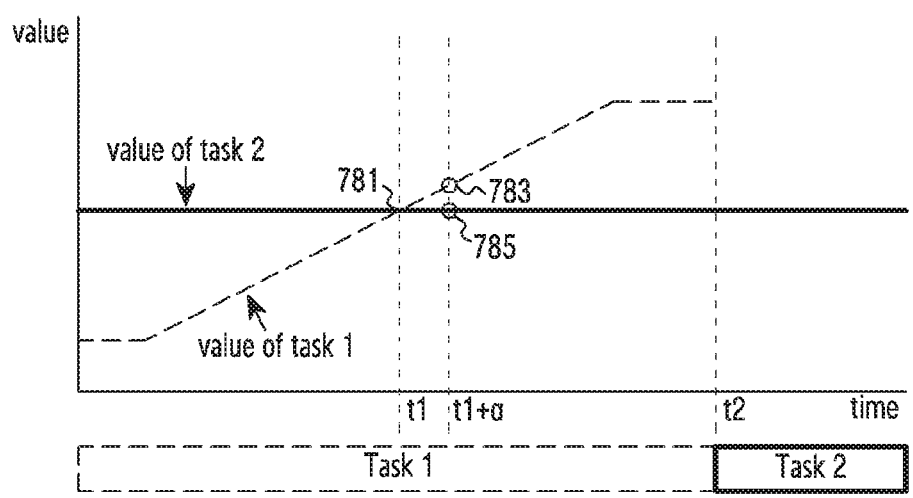
FIG. 7E is a view illustrating an example of determining a scheduling type based on reference values of the plurality of tasks in the electronic device according to various embodiments.

According to various embodiments, when the reference value of the first task and the reference value of the second task are the same as each other in operation 611, the electronic device (for example, the processor 120) may compare a reference value of the first task and a reference value of the second task which correspond to a second time in operation 625. For example, the processor 120 may compare the reference value of the first task and the reference value of the second task which correspond to the second time which is elapsed from the first time by a designated time. For example, as shown in FIG. 7E, when the reference value 781 of the first task and the reference value 781 of the second task which correspond to the first time t1 at which the interrupt occurs are the same as each other, the electronic device may compare a reference value 783 of the first task and a reference value 785 of the second task which correspond to the second time t1+α, and may determine a scheduling type based on a result of comparing.

In FIGS. 7A, 7B, 7C, 7D, and 7E described above, it is assumed that the reference value of the first task increases in some time sections, and has a fixed value in the other time sections, and the reference value of the second task has a fixed constant regardless of time. However, various embodiments of the disclosure are not limited hereto. For example, the reference value of the first task may be fixed regardless of time, and the reference value of the second task may have a value changeable over time.

As described above, a reference value of a task is changeable over time according to various embodiments. Accordingly, a result of scheduling the first task and the second task may vary according to a time at which an interrupt occurs.

Figure 8:
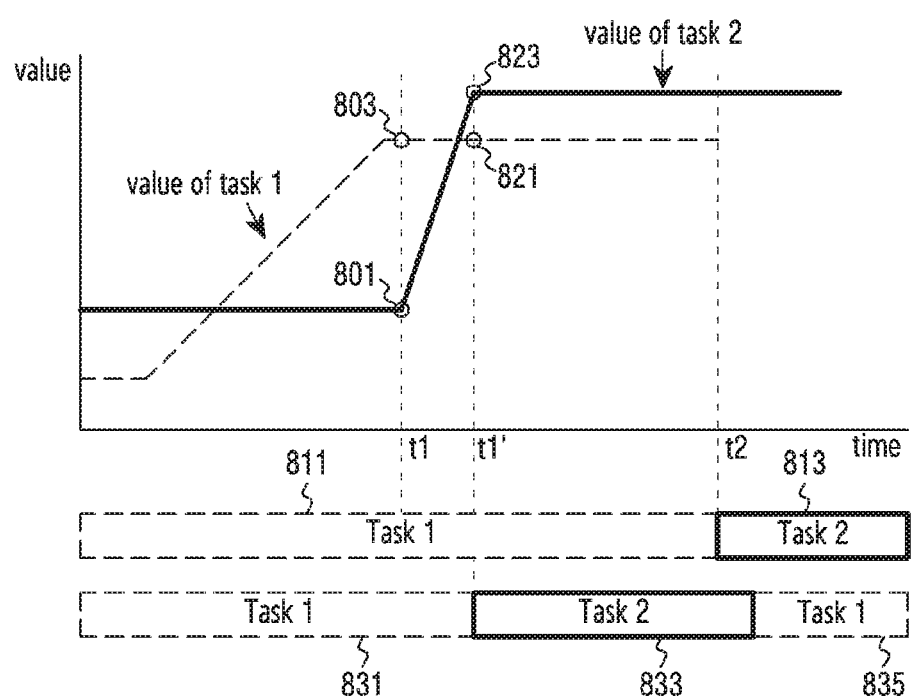
FIG. 8 is a view illustrating an example of determining a scheduling type based on reference values of the plurality of tasks in the electronic device according to various embodiments.

FIG. 8 illustrates a view of an example of determining a scheduling type based on reference values of a plurality of tasks in the electronic device according to various embodiments.

Referring to FIG. 8, when the electronic device (for example, the processor 120 of FIG. 1) detects an interrupt requesting the second task at a time t1 while processing the first task (811), the electronic device (the processor 120) may determine the scheduling type to be the delay type since a reference value 803 of the first task at the time t1 is larger than a reference value 801 of the second task, and, after processing of the first task (811) is completed, the electronic device may process the second task (813). On the other hand, when the electronic device (for example, the processor 120) detects an interrupt requesting the second task at a time t1' while processing the first task (831), the electronic device (the processor 120) may determine the scheduling type to be the merge type or the interrupt type since a reference value 821 of the first task at the time t1' is smaller than a reference value 823 of the second task, and the electronic device may interrupt processing of the first task (831) and then may process the second task (833). When the scheduling type is the merge type, the processor 120 may resume processing of the first task (835) after completing processing of the second task (833).

Figure 9:
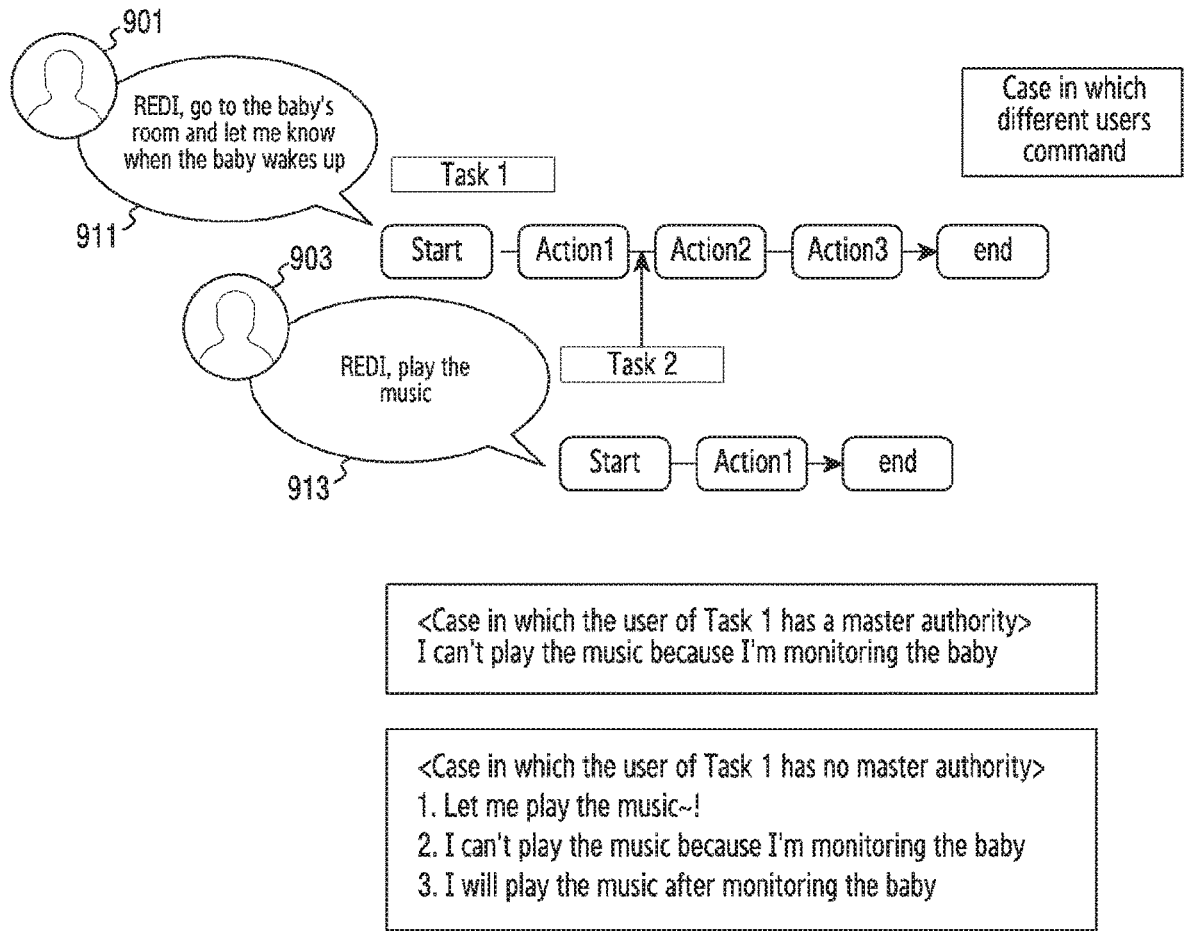
FIG. 9 is a view illustrating an example of scheduling tasks corresponding to commands of different users in an electronic device according to various embodiments.
Figure 10:
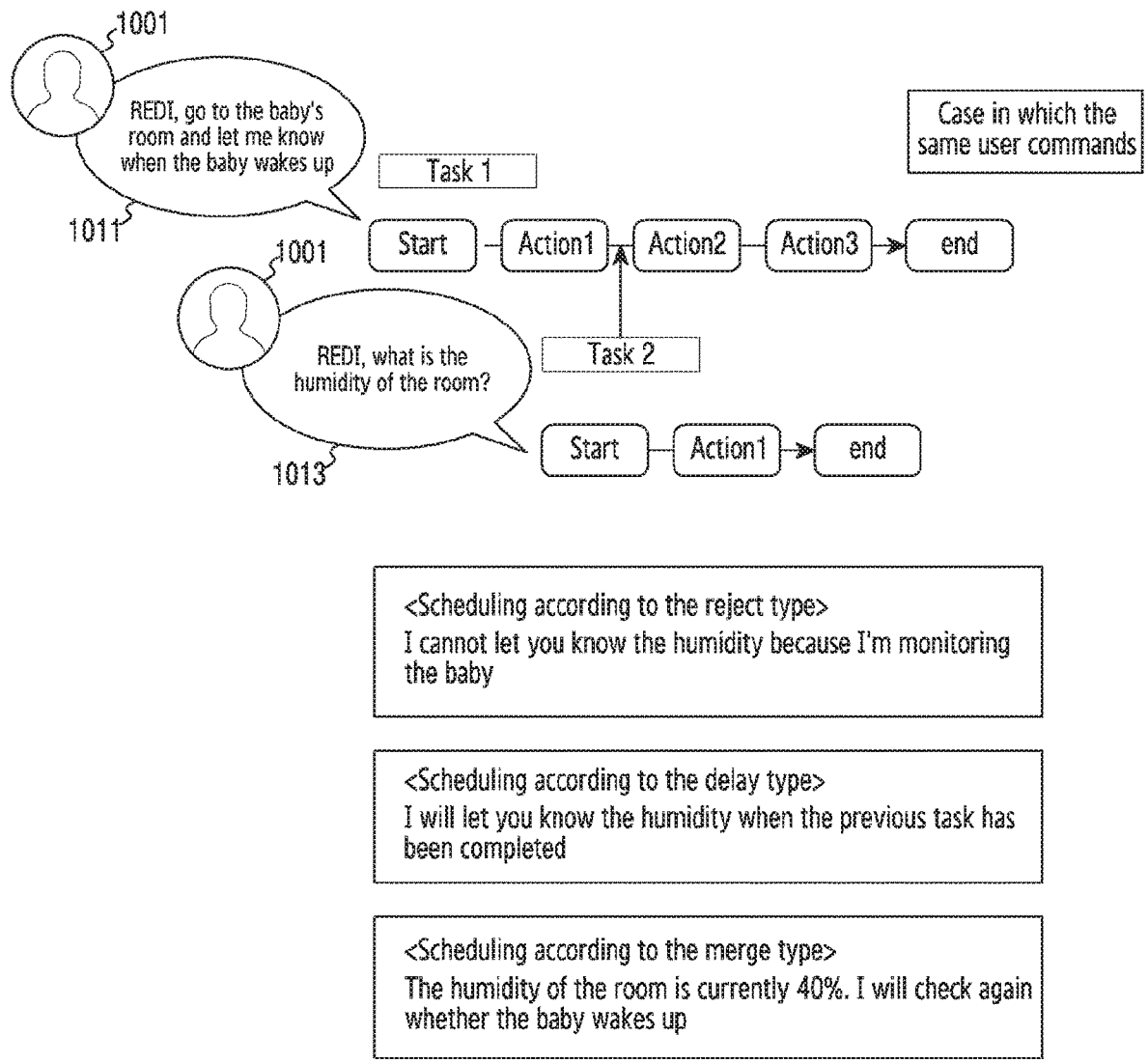
FIG. 10 is a view illustrating an example of scheduling tasks corresponding to commands of the same user in the electronic device according to various embodiments.
Figure 11:
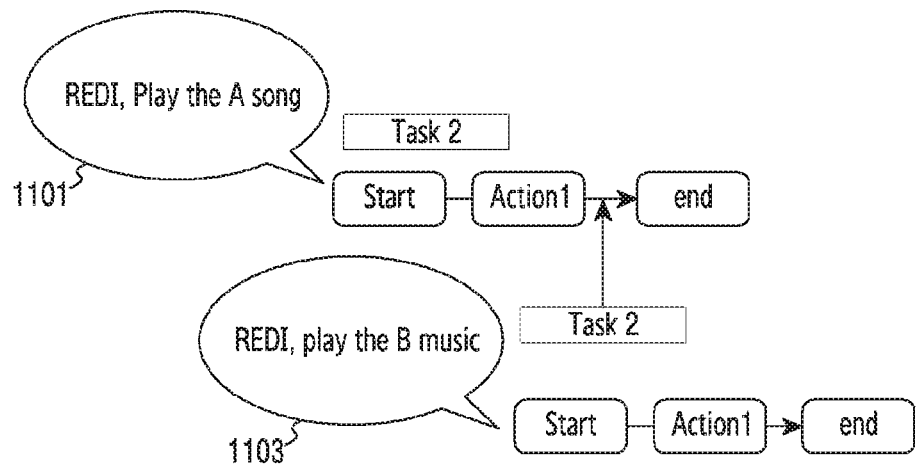
FIG. 11 is a view illustrating an example of scheduling tasks corresponding to commands of the same type in the electronic device according to various embodiments.

As described above, a reference value of a task according to various embodiments may be changed according to at least one of whether a user is a user of a master authority, an affinity of the user, a type of the task, or a task detecting order. As described above in FIG. 5A, the electronic device (for example, the processor 120 of FIG. 1) according to various embodiments may dynamically select parameters to be used to determine reference values, based on whether at least one user of the users of the tasks has a master authority, whether the users of the respective tasks are the same, or the types of the respective tasks are the same. FIGS. 9, 10, and 11 illustrate examples of dynamically selecting parameters to be used to determine reference values and scheduling according to various embodiments.

FIG. 9 illustrates an example of scheduling tasks corresponding to commands of different users in the electronic device according to various embodiments. In the embodiment of FIG. 9, it is assumed that an affinity of a first user 901 is lower than an affinity of a second user 903 for convenience of explanation.

Referring to FIG. 9, the electronic device 101 may receive a first command 911 saying "REDI, go to the baby's room and let me know when the baby wakes up." from the first user 901, and, in the middle of performing a first task including three actions in response to the received command, the electronic device 101 may receive a second command 913 saying "REDI, play the B music." from another user, the second user 903. The electronic device 101 may recognize that the first user 901 corresponding to the first command 911 and the second user 903 corresponding to the second command 913 are different from each other, and may determine whether the first user 901 or the second user 903 is a user of a master authority. According to an embodiment, when the first user 901 is the user of the master authority, the electronic device 101 may schedule the first task corresponding to the first command 911 of the first user 901 to be performed always in preference to a second task corresponding to the second command 913 of the second user 903, regardless of the affinity of the first user 901. For example, the electronic device 101 may determine a reference value of the first task to a maximum value, and may determine the scheduling type to be the delay or reject type, such that the first task is continuously performed. The electronic device 101 may output a guidance message such as "I can't play the music because I'm monitoring the baby." According to an embodiment, when the first user 901 is not the user of the master authority, the electronic device 101 may determine the scheduling type based on the affinity of the first user 901, the affinity of the second user 903, a type of the first task corresponding to the first command 911, and a type of the second task corresponding to the second command 913. For example, the electronic device 101 may determine a reference value of the first task based on the affinity of the first user 901 and the type of the first task, and may determine a reference value of the second task based on the affinity of the second user 903 and the type of the second task. The electronic device 101 may determine any one of the interrupt, merge, delay, or reject type as the scheduling type, based on the reference value of the first task and the reference value of the second task, and may process the first task and the second task while outputting a guidance message according to the determined scheduling type. For example, when the scheduling type is determined to be the interrupt type or the merge type, the electronic device 101 may output a guidance message such as "Let me play the music~!" When the scheduling type is determined to be the delay type, the electronic device 101 may output a guidance message such as "I will play the music after monitoring the baby." When the scheduling type is determined to be the reject type, the electronic device 101 may output a guidance message such as "I can't play the music because I'm monitoring the baby."

FIG. 10 illustrates an example of scheduling tasks corresponding to commands of the same user in the electronic device according to various embodiments.

Referring to FIG. 10, the electronic device 101 may receive a first command 1011 saying "REDI, go to the baby's room and let me know when the baby wakes up." from a first user 1001, and, in the middle of performing a first task including three actions in response to the received command, the electronic device 101 may receive a second command 1013 saying "REDI, what is the humidity of the room?" from the same user, the first user 1001. The electronic device 101 may recognize that the users of the first command 1011 and the second command 1013 are the same, and may recognize that a master authority and/or a user affinity does not influence scheduling. The electronic device 101 may determine the scheduling type based on a type of the first task corresponding to the first command 1011, and a type of a second task corresponding to the second command 1013. For example, the electronic device 101 may determine a reference value of the first task based on the type of the first task, and may determine a reference value of the second task based on the type of the second task. The electronic device 101 may determine any one of the interrupt, merge, delay, or reject type as the scheduling type based on the reference value of the first task and the reference value of the second task, and may process the first task and the second task while outputting a guidance message according to the determined scheduling type. For example, when the scheduling type is determined to be the reject type, the electronic device 101 may output a guidance message such as "I cannot let you know the humidity because I'm monitoring the baby." When the scheduling type is determined to be the delay type, the electronic device 101 may output a guidance message such as "I will let you know the humidity when the previous task has been completed." When the scheduling type is determined to be the merge type, the electronic device 101 may output a guidance message such as "The humidity of the room is currently 40%. I will check again whether the baby wakes up." In the embodiment of FIG. 10, since an attribute of the first task has a designated attribute, the electronic device 101 may determine the scheduling type to be types other than the interrupt type.

FIG. 11 illustrates an example of scheduling tasks corresponding to commands of the same type in the electronic device according to various embodiments.

Referring to FIG. 11, the electronic device 101 may receive a first command 1101 saying "REDI, play the A song.", and in the middle of performing a first task in response to the received first command 1101, the electronic device 101 may receive a second command 1103 saying "REDI, play the B music." requesting a second task of the same type as the type of the first task. The electronic device 101 may recognize that the type of the first task corresponding to the first command 1101 and the type of the second task corresponding to the second command 1103 are the same, and may recognize that the type of the tasks does not influence scheduling. The electronic device 101 may determine whether a user of the first command 1101 and a user of the second command 1103 are the same, and based on this determination, may determine a scheduling type. When the user of the first command 1101 and the user of the second command 1103 are the same as each other, the electronic device 101 may recognize that a user affinity and the task type do not influence scheduling, and may give a weight to the second task, such that a reference value of the second task detected at a later time is larger than a reference value of the first task. The electronic device 101 may give the weight to the second task, thereby determining the scheduling type to be the interrupt type, and may output a guidance message such as "I will play the B music." When the user of the first command 1101 and the user of the second command 1103 are different from each other, the electronic device 101 may determine a reference value of the first task based on an affinity of the user corresponding to the first command 1101, and may determine a reference value of the second task based on an affinity of the user corresponding to the second command 1103. The electronic device 101 may determine any one type of the interrupt, merge, delay, or reject type as the scheduling type based on the reference value of the first task and the reference value of the second task, and may process the first task and the second task while outputting a guidance message according to the determined scheduling type. For example, when the scheduling type is determined to be the delay type, the electronic device 101 may output a guidance message such as "I will play it after the A song ends." When the scheduling type is determined to be the interrupt type, the electronic device 101 may output a guidance message such as "I will play the B music." When the scheduling type is determined to be the reject type, the electronic device 101 may output a guidance message such as "Sorry, I cannot play the B music. I should do the cleaning when the A song ends." In the embodiment of FIG. 10, since the attribute of the first task is not the designated attribute, the electronic device may determine the scheduling type to be types other than the merge type.

According to various embodiments, an operating method of an electronic device (for example, the processor 120 of FIG. 1) may include: detecting occurrence of an interrupt requesting performance of a second task while performing a first task; obtaining reference values according to a time of the first task, and reference values according to a time of the second task; scheduling the first task and the second task based on a reference value of the first task and a reference value of the second task which correspond to a time at which the interrupt occurs; and processing the first task and the second task based on a result of the scheduling.

According to various embodiments, obtaining the reference values according to the time of the first task and the reference value according to the time of the second task may include, obtaining the reference values according to the time of the first task, based on at least one of an affinity of a user related to the first task or a type of the first task, and obtaining the reference values according to the time of the second task, based on at least one of an affinity of a user related to the second task or a type of the second task.

According to various embodiments, the affinity of the user may be determined based on at least one of a number of times a command is received from the user, or a time spent interacting with the user.

According to various embodiments, the reference values according to the time of the first task may be expressed by a function a value of which changes over time, or fixed constant values, and the reference values according to the time of the second task may be expressed by a function a value of which changes over time, or fixed constant values.

According to various embodiments, scheduling may include scheduling the first task and the second task, further based on at least one of a remaining time to perform the first task, a total time required to perform the second task, or a remaining capacity of a battery of the electronic device.

According to various embodiments, scheduling may include: comparing the reference value of the first task corresponding to the time at which the interrupt occurs, and the reference value of the second task corresponding to the time at which the interrupt occurs, and determining a scheduling type for the first task and the second task based on a result of the comparing.

According to various embodiments, the scheduling type may include at least one of an interrupt type according to which processing of the first task is interrupted and the second task is processed, a merge type according to which processing of the first task is temporarily interrupted and then the second task is processed, and processing of the first task is resumed when processing of the second task is completed, a delay type according to which processing of the first task is completed and then the second task is processed, or a reject type according to which processing of the second task is rejected and the first task is processed.

According to various embodiments, determining the scheduling type may include: when the reference value of the first task is smaller than the reference value of the second task as the result of the comparing, determining whether an attribute of the first task is a designated attribute; when the attribute of the first task is the designated attribute, determining the scheduling type to be the merge type, and, when the attribute of the first task is not the designated attribute, determining the scheduling type to be the interrupt type.

According to various embodiments, determining the scheduling type may include: when the reference value of the first task is larger than the reference value of the second task as the result of the comparing, determining an estimated time of completion of processing of the first task and the second task; determining whether there exits a third task scheduled to start before the estimated time of the completion of the processing; when there does not exist the third task scheduled to start before the estimated time of the completion of the processing, determining the scheduling type to be the delay type; and, when there exists the third task scheduled to start before the estimated time of the completion of the processing, determining the scheduling type to be any one of the delay type or the reject type, further based on a reference value according to a time of the third task.

According to various embodiments, determining the scheduling type to be any one of the delay type or the reject type may include: comparing a reference value of the second task and a reference value of the third task which correspond to an scheduled start time of the third task; when the reference value of the third task is larger than or equal to the reference value of the second task, determining the scheduling type to be the reject type; and, when the reference value of the second task is smaller than the reference value of the third task, determining the scheduling type to be the delay type.

According to various embodiments, determining whether there exits the third task scheduled to start before the estimated time of the completion of the processing may include: determining a battery charging start time based on a remaining capacity of the battery of the electronic device; and, when the charging start time is before the estimated time of the completion of the processing of the first task and the second task, determining that there exists the third task scheduled to start before the estimated time of the completion of the processing.

According to various embodiments, the electronic device determines reference values which are changeable over time with respect to each of the plurality of tasks, and schedules the plurality of tasks by using the determined reference values, thereby dynamically scheduling the plurality of tasks dynamically according to a situation.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a processor; and
   a memory operatively connected to the processor,
   wherein, when being executed, the memory stores instructions that cause the processor to:
   detect occurrence of an interrupt requesting performance of a second task while performing a first task;
   identify a user based on a voice command of the user corresponding to the interrupt;
   determine whether the identified user is a same as a user of the first task;
   in response to determining that the identified user and the user of the first task are not the same, obtain an affinity of the user of the first task and an affinity of the user of the second task;
   obtain reference values according to a time of the first task based on the affinity of the user of the first task, and reference values according to a time of the second task based on the affinity of the user of the second task;
   schedule the first task and the second task based on a reference value of the first task and a reference value of the second task, the reference value of the first task and the reference value of the second task each corresponding to a time at which the interrupt occurs; and
   process the first task and the second task based on a result of the scheduling.

2. The electronic device of claim 1, wherein the instructions further cause the processor to:
   obtain the reference values according to the time of the first task, based on a type of the first task; and
   obtain the reference values according to the time of the second task, based on a type of the second task.

3. The electronic device of claim 2, wherein the affinity of the user of the first task or the affinity of the user of the second task is determined based on at least one of a number of times a command is received from the user, or a time spent interacting with the user.

4. The electronic device of claim 1, wherein the reference values according to the time of the first task are expressed by a function a value of which changes over time, or fixed constant values, and wherein the reference values according to the time of the second task are expressed by a function a value of which changes over time, or fixed constant values.

5. The electronic device of claim 1, wherein the instructions further cause the processor to schedule the first task and the second task, further based on at least one of a remaining time to perform the first task, a total time required to perform the second task, or a remaining capacity of a battery of the electronic device.

6. The electronic device of claim 1, wherein the instructions further cause the processor to:
compare the reference value of the first task corresponding to the time at which the interrupt occurs, and the reference value of the second task corresponding to the time at which the interrupt occurs; and
determine a scheduling type for the first task and the second task based on a result of the comparing,
wherein the scheduling type comprises at least one of an interrupt type according to which processing of the first task is interrupted and the second task is processed, a merge type according to which processing of the first task is temporarily interrupted and then the second task is processed, and processing of the first task is resumed when processing of the second task is completed, a delay type according to which processing of the first task is completed and then the second task is processed, or a reject type according to which processing of the second task is rejected and the first task is processed.

7. The electronic device of claim 6, wherein the instructions further cause the processor to:
in response to the reference value of the first task being smaller than the reference value of the second task as the result of the comparing, determine whether an attribute of the first task is a designated attribute;
in response to the attribute of the first task being the designated attribute, determine the scheduling type to be the merge type; and
in response to the attribute of the first task not being the designated attribute, determine the scheduling type to be the interrupt type.

8. The electronic device of claim 6, wherein the instructions further cause the processor to:
in response to the reference value of the first task being larger than the reference value of the second task as the result of the comparing, determine an estimated time of a completion of processing of the first task and the second task;
determine whether there exists a third task scheduled to start before the estimated time of the completion of the processing;
in response to the third task not being scheduled to start before the estimated time of the completion of the processing, determine the scheduling type to be the delay type; and
in response to the third task being scheduled to start before the estimated time of the completion of the processing, determine the scheduling type to be any one of the delay type or the reject type, further based on a reference value according to a time of the third task.

9. The electronic device of claim 8, wherein the instructions further cause the processor to:
in response to the third task being scheduled to start before the estimated time of the completion of the processing, compare a reference value of the second task and a reference value of the third task which correspond to a scheduled start time of the third task;

in response to the reference value of the third task being larger than or equal to the reference value of the second task, determine the scheduling type to be the reject type; and
in response to the reference value of the second task being smaller than the reference value of the third task, determine the scheduling type to be the delay type.

10. The electronic device of claim 8, wherein the instructions further cause the processor to:
determine a battery charging start time based on a remaining capacity of the battery of the electronic device; and
in response to the charging start time being before the estimated time of the completion of the processing of the first task and the second task, determine that there exists the third task scheduled to start before the estimated time of the completion of the processing.

11. An operating method of an electronic device, the method comprising:
detecting occurrence of an interrupt requesting performance of a second task while performing a first task;
identifying a user based on a voice command of the user corresponding to the interrupt;
determining whether the identified user is a same as a user of the first task;
in response to determining that the identified user and the user of the first task are not the same, obtaining an affinity of the user of the first task and an affinity of the user of the second task;
obtaining reference values according to a time of the first task based on the affinity of the user of the first task, and reference values according to a time of the second task based on the affinity of the user of the second task;
scheduling the first task and the second task based on a reference value of the first task and a reference value of the second task, the reference value of the first task and the reference value of the second task each corresponding to a time at which the interrupt occurs; and
processing the first task and the second task based on a result of the scheduling.

12. The method of claim 11, wherein obtaining the reference values according to the time of the first task and the reference values according to the time of the second task comprises;
obtaining the reference values according to the time of the first task, based on a type of the first task; and
obtaining the reference values according to the time of the second task, based on a type of the second task.

13. The method of claim 12, wherein the affinity of the user of the first task or the affinity of the user of the second task is determined based on at least one of a number of times a command is received from the user, or a time spent interacting with the user.

14. The method of claim 11, wherein the reference values according to the time of the first task are expressed by a function a value of which changes over time, or fixed constant values, and
wherein the reference values according to the time of the second task are expressed by a function a value of which changes over time, or fixed constant values.

15. The method of claim 11, wherein scheduling further comprises scheduling the first task and the second task, further based on at least one of a remaining time to perform the first task, a total time required to perform the second task, or a remaining capacity of a battery of the electronic device.

16. The method of claim 11, wherein scheduling further comprises:

comparing the reference value of the first task corresponding to the time at which the interrupt occurs, and the reference value of the second task corresponding to the time at which the interrupt occurs; and determining a scheduling type for the first task and the second task based on a result of the comparing, wherein the scheduling type comprises at least one of an interrupt type according to which processing of the first task is interrupted and the second task is processed, a merge type according to which processing of the first task is temporarily interrupted and then the second task is processed, and processing of the first task is resumed when processing of the second task is completed, a delay type according to which processing of the first task is completed and then the second task is processed, or a reject type according to which processing of the second task is rejected and the first task is processed.

17. The method of claim 16, wherein determining the scheduling type further comprises:

in response to the reference value of the first task being smaller than the reference value of the second task as the result of the comparing, determining whether an attribute of the first task is a designated attribute;

in response to the attribute of the first task being the designated attribute, determining the scheduling type to be the merge type; and in response to the attribute of the first task not being the designated attribute, determining the scheduling type to be the interrupt type.

18. The method of claim 16, wherein determining the scheduling type further comprises:

in response to the reference value of the first task is larger than the reference value of the second task as the result of the comparing, determining an estimated time of a completion of processing of the first task and the second task;

determining whether there exists a third task scheduled to start before the estimated time of the completion of the processing;

in response to the third task not being scheduled to start before the estimated time of the completion of the processing, determining the scheduling type to be the delay type; and in response to the third task being scheduled to start before the estimated time of the completion of the processing, determining the scheduling type to be any one of the delay type or the reject type, further based on a reference value according to a time of the third task.

19. The method of claim 18, wherein determining the scheduling type to be any one of the delay type or the reject type further comprises:

comparing a reference value of the second task and a reference value of the third task which correspond to a scheduled start time of the third task;

in response to the reference value of the third task being larger than or equal to the reference value of the second task, determining the scheduling type to be the reject type; and in response to the reference value of the second task being smaller than the reference value of the third task, determining the scheduling type to be the delay type.

20. The method of claim 18, wherein determining whether there exits the third task scheduled to start before the estimated time of the completion of the processing further comprises:

determining a battery charging start time based on a remaining capacity of the battery of the electronic device; and in response to the charging start time being before the estimated time of the completion of the processing of the first task and the second task, determining that there exists the third task scheduled to start before the estimated time of the completion of the processing.

* * * * *